United States Patent
Shimamura et al.

(10) Patent No.: US 7,508,963 B2
(45) Date of Patent: Mar. 24, 2009

(54) SURFACE SHAPE RECOGNITION SENSOR DEVICE

(75) Inventors: Toshishige Shimamura, Kanagawa (JP); Hiroki Morimura, Kanagawa (JP); Satoshi Shigematsu, Kanagawa (JP); Norio Sato, Kanagawa (JP); Masami Urano, Kanagawa (JP); Katsuyuki Machida, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 12/079,818

(22) Filed: Mar. 28, 2008

(65) Prior Publication Data

US 2008/0187192 A1    Aug. 7, 2008

Related U.S. Application Data

(62) Division of application No. 10/528,283, filed as application No. PCT/JP2004/011606 on Aug. 12, 2004, now Pat. No. 7,366,332.

(30) Foreign Application Priority Data

Aug. 26, 2003 (JP) .............................. 2003-300913
Sep. 5, 2003 (JP) .............................. 2003-314568

(51) Int. Cl.
    *G06K 9/00* (2006.01)

(52) U.S. Cl. ........................ 382/124; 382/115; 382/127; 382/299; 382/125; 340/5.53; 340/5.83; 702/104; 702/130

(58) Field of Classification Search ................. 382/124, 382/115, 299, 125; 324/681, 686, 662; 473/300; 340/5.53, 5.83; 702/104, 130
See application file for complete search history.

(56) References Cited

U.S. PATENT DOCUMENTS 4,771,268 A * 9/1988 Sone et al. .................... 341/22

(Continued)

FOREIGN PATENT DOCUMENTS

JP         02-001243 A    1/1990

(Continued)

*Primary Examiner*—Jingge Wu
*Assistant Examiner*—Nancy Bitar
(74) *Attorney, Agent, or Firm*—Blakely, Sokoloff, Taylor & Zafman LLP

(57) ABSTRACT

A detection element (1A) having a detection electrode (11A) connected to a surface shape detection unit (2) and a detection electrode (12A) connected to a common potential, and a detection element (1B) having a detection electrode (11B) connected to the surface shape detection unit (2) and a detection electrode (12B) connected to a biometric recognition unit (3) are arranged. The surface shape detection unit (2) outputs a signal representing the three-dimensional pattern of the surface shape corresponding to the contact portion to each detection element on the basis of individual capacitances obtained from the detection elements (1A, 1B). The biometric recognition unit (3) determines whether an object (9) is a living body, on the basis of a signal corresponding to the impedance of the object (9) connected between the detection electrode (12B) of the detection element (1B) and the detection electrode (12A) of the detection element (1A).

4 Claims, 22 Drawing Sheets

U.S. PATENT DOCUMENTS

| | | | | |
|---|---|---|---|---|
| 5,325,442 A | * | 6/1994 | Knapp | 382/124 |
| 6,501,284 B1 | * | 12/2002 | Gozzini | 324/681 |
| 6,844,744 B2 | | 1/2005 | Ishii et al. | 324/686 |
| 7,062,075 B2 | | 6/2006 | Morimura et al. | 382/124 |
| 7,184,581 B2 | * | 2/2007 | Johansen et al. | 382/124 |
| 2003/0072475 A1 | * | 4/2003 | Tamori | 382/124 |
| 2005/0244038 A1 | * | 11/2005 | Benkley, III | 382/126 |
| 2005/0259850 A1 | * | 11/2005 | Shimamura et al. | 382/124 |
| 2006/0034493 A1 | * | 2/2006 | Shimamura et al. | 382/115 |

FOREIGN PATENT DOCUMENTS

| | | |
|---|---|---|
| JP | 10-165382 A | 6/1998 |
| JP | 11-185020 A | 7/1999 |
| JP | 2002-112980 A | 4/2002 |
| JP | 2002-162204 A | 6/2002 |
| JP | 2003-111749 A | 4/2003 |

* cited by examiner

TO SURFACE SHAPE DETECTION UNIT 2

TO BIOMETRIC RECOGNITION UNIT 3

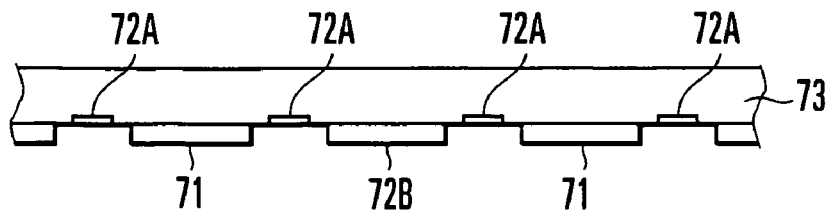
F I G. 22A
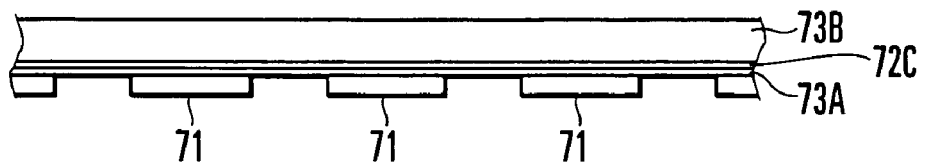
F I G. 22B
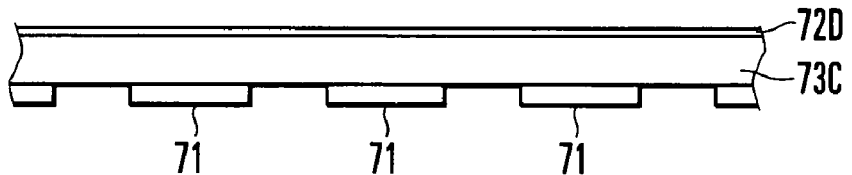
F I G. 22C
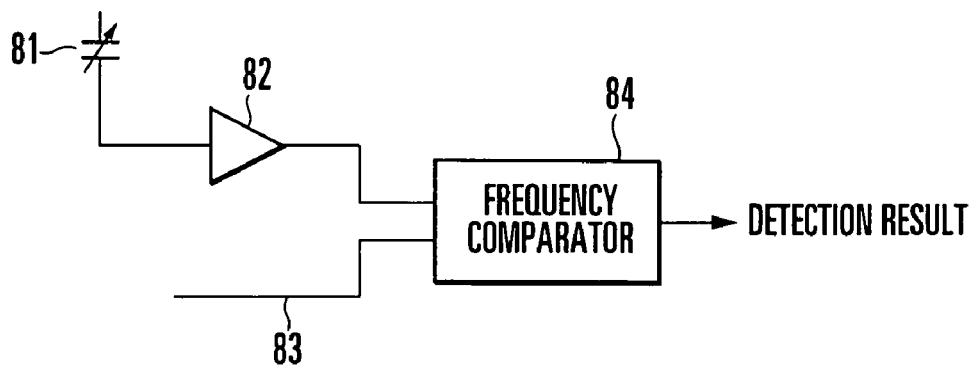
F I G. 23

SURFACE SHAPE RECOGNITION SENSOR DEVICE

The present patent application is a Divisional of non-provisional application Ser. No. 10/528,283, filed Mar. 16, 2005 now U.S. Pat. No. 7,366,332 which is a non-provisional application of International Application No. PCT/JP2004/011606, filed Aug. 12, 2004.

TECHNICAL FIELD

The present invention relates to a surface shape recognition sensor device and, more particularly, to a biometric recognition technique for recognizing a person by detecting biometric information such as a fingerprint from an object.

BACKGROUND ART

As the information-oriented society becomes more advanced, technologies for security protection of information processing systems have been developed. For example, ID cards are conventionally used to control access to computer rooms. However, the cards can be missing or stolen at high probability. To prevent this, introduction of personal recognition systems is starting, in which the fingerprint or the like of each person is registered in advance, and the fingerprint unique to each person is collated when he/she accesses the room, instead of using the ID cards.

Such a personal recognition system sometimes passes, e.g., a replica of a registered fingerprint. Hence, the personal recognition system must also recognize that the object is a living body in addition to fingerprint collation.

First Prior Art

The first prior art will be described which detects that an object is a living body (e.g., Japanese Patent Laid-Open Nos. 2002-112980 and 2002-162204). In a fingerprint detection device according to the first prior art, the absolute capacitance of a finger placed on the sensor surface is measured. For this purpose, using the sensor structure shown in FIGS. 22A to 22C, finger detection is done by a capacitive grid or capacitive plate which is arranged on the upper side of a finger sensor electrode.

A finger detection sensor electrode is electrically insulated from a fingerprint sensor electrode. Finger detection sensor electrodes may be arranged between fingerprint detection sensor electrodes 71 and on different surfaces, like finger detection sensor electrodes 72A shown in FIG. 22A. Alternatively, the finger detection sensor electrodes may replace the fingerprint detection sensor electrodes 71 and be arranged on the same surface, like a finger detection sensor electrodes 72B.

As shown in FIG. 22B, a finger detection sensor electrode 72C may be arranged on the upper side of the fingerprint detection sensor electrodes 71 while sandwiching a protective film 73A and covered with a protective film 73B. As shown in FIG. 22C, a finger detection sensor electrode 72D may be formed on the upper side of the fingerprint detection sensor electrodes 71 to be exposed through a protective film 73C.

On the basis of the finger capacitance thus measured, finger detection is done by the circuit arrangement shown in FIG. 23. The capacitance generated in a finger detection sensor electrode 81 is converted into a representative frequency by a representative frequency converter 82 and compared with a reference frequency or frequency range 83 by a frequency comparator 84 to determine whether the measured capacitance matches the predicted biological characteristic of living skin tissue. Accordingly, advanced finger detection is implemented.

Second Prior Art

The second prior art to detect that an object is a living body will be described (e.g., Japanese Patent Laid-Open No. 11-185020). In an individual authentication sensor according to the second prior art, a plurality of measurement electrodes 91 are arranged on a semiconductor substrate, and a common electrode 92 is arranged around the measuring electrodes 91, as shown in FIG. 24. Switching elements which selectively connect the respective measuring electrodes 91 to an I-V conversion circuit (detection circuit) 96 can be selected by scanning a row shift register 95 and column shift register 94.

A switch means 92A is arranged, which switches the common electrode 92 between the power supply and ground in measuring to detect contact of an authentication target to the measuring electrodes 91 or in standby without the measurement.

When the common electrode 92 is spaced apart from the measuring electrodes 91, the presence/absence of a characteristic feature of a living body can be detected between a fingertip and a body part except the finger and, for example, the back of the hand. More specifically, this technique uses the fact that the distance between the electrodes does not depend on the measurement result because the internal resistance of the finger is low.

DISCLOSURE OF INVENTION

Problems to be Solved by the Invention

In the above-described prior arts, however, no accurate biometric recognition can be executed because of a potential variation induced to the object. In addition, a detection element for biometric recognition must be arranged independently of the detection element for surface shape detection. This results in an increase in layout area and manufacturing cost per chip.

For example, in the first prior art, when the capacitance is measured by the finger detection sensor electrode, an error occurs in capacitance measurement due to the potential variation induced to the finger because the potential of the finger is not fixed. For this reason, the determination result is inaccurate, and no sufficient security can be ensured. In addition, whether the object is a living body is determined by converting the capacitance of the finger into a frequency or measuring the resistance of the finger. Since only the capacitance component and resistance component of the impedance of the finger cannot be detected, even an artificial finger made of an adjusted material is recognized as a living body.

Furthermore, when the capacitance-to-frequency converter to process the capacitance of the finger or the resistance measuring device to measure the resistance of the finger and the comparison circuit are formed by conventional circuits, external components are necessary. For this reason, the number of components increases, and it becomes difficult to reduce the device size. In addition, no sufficient security can be ensured when the detection signal is read from the interconnection to connect the components. In this case, the condition to determine a living body can easily be estimated from the element value of the external component.

In the above-described first prior art, in biometric authentication, the layout of the sensor electrodes to detect the electrical characteristic from the object and the circuit portion to execute biometric recognition on the basis of the signals from the sensor electrodes is not taken into consideration. In some layouts of the sensor electrodes and circuit portion, no sufficient determination accuracy or security of biometric recognition can be obtained.

For example, referring to FIGS. 22A to 22C, the finger detection circuit shown in FIG. 23 is not arranged near the finger detection sensor electrodes 71A, 71B, 71C, and 71D. When the interconnection to connect the finger detection sensor electrodes to the finger detection circuit is relatively long, the parasitic capacitance or noise of the interconnection increases. Hence, the capacitance of the object cannot accurately be detected, and the biometric recognition accuracy decreases.

In addition, whether the object is a living body is determined by converting the capacitance of the finger into a frequency or measuring the resistance of the finger. Since only the capacitance component and resistance component of the impedance of the finger cannot be detected, even an artificial finger made of an adjusted material is recognized as a living body.

In the second prior art, as shown in FIG. 24, a second common electrode 93 is arranged independently of the fingerprint sensor array. This results in an increase in layout area and manufacturing cost per chip. The object is determined as a living body when the distance between the electrodes 91 is changed, and the resistance does not change. When the internal resistance of an artificial finger is low, it is recognized as a living body. The resistance of a finger is measured. As in the first prior art, since only the capacitance component and resistance component of the impedance of the finger cannot be detected, even an artificial finger made of an adjusted material is recognized as a living body.

The present invention has been made to solve these problems, and has as its object to provide a surface shape recognition sensor device which can accurately execute biometric recognition by suppressing the potential variation induced to the object and easily implement on-chip device formation by avoiding any increase in device size due to addition of a detection electrode.

It is another object of the present invention to provide a surface shape recognition sensor device which can obtain sufficient determination accuracy and security of biometric recognition and easily implement on-chip device formation by avoiding any increase in device size.

Means of Solution to the Problems

In order to achieve the above objects, a surface shape recognition sensor device according to the present invention comprises a plurality of detection elements which are two-dimensionally arranged, a first detection electrode which is included in each detection element and comes into contact with an object through an insulating film to generate a capacitance corresponding to a three-dimensional pattern of a surface shape of the object, a second detection electrode which is included in each detection element and comes into electrical contact with the detection element, a surface shape detection unit which detects the three-dimensional pattern of the surface shape as an output from the detection element on the basis of the capacitance obtained through the first detection electrode of the detection element, and a biometric recognition unit which determines whether the object is a living body, on the basis of a signal corresponding to an impedance of the object connected between the second detection electrodes included in at least a first detection element and second detection element of the detection elements. The second detection electrode of the first detection element is connected to a predetermined common potential, and the second detection electrode of the second detection element is connected to the biometric recognition unit.

The device may further comprise a third detection element which is arranged between the first detection element and the second detection element and has the first detection electrode connected to the surface shape detection unit and the second detection electrode set in a high-impedance state.

The device may further comprise a switch which is connected between the common potential and the second detection electrode of the third detection element to disconnect the second detection electrode from the common potential when the biometric recognition unit executes biometric determination of the object and short-circuit the second detection electrode to the common potential when the surface shape detection unit detects the surface shape.

The device may further comprise a third detection element which is arranged between the first detection element and the second detection element, has the first detection electrode connected to the surface shape detection unit and the second detection electrode connected to the common potential, and includes an insulating film which insulates the second detection electrode from the object.

The device may further comprise a switch which is connected between the biometric recognition unit and the second detection electrode of the second detection element to selectively connect the second detection electrode to the biometric recognition unit when the biometric recognition unit executes biometric determination of the object and selectively connect the second detection electrode to the common potential when the surface shape detection unit detects the surface shape.

The sensor surface may have a structure comprising a band-shaped second detection region which includes a plurality of second detection elements arranged adjacent to each other and is arranged to cross a center of the detection surface, two band-shaped first detection regions which include a plurality of first detection elements arranged adjacent to each other and are arranged on both sides of the second detection region, and two band-shaped third detection regions which include a plurality of third detection elements arranged adjacent to each other and are arranged outside the first detection regions.

The sensor surface may have another structure comprising a second detection region which includes a plurality of second detection elements arranged adjacent to each other and is arranged at a center of the detection surface, a first detection region which includes a plurality of first detection elements arranged adjacent to each other and is arranged to surround an entire periphery of the second detection region, and a third detection region which includes a plurality of third detection elements arranged adjacent to each other and is arranged to surround an entire periphery of the first detection region.

The sensor surface may have a structure comprising a band-shaped second detection region which includes a plurality of second detection elements arranged adjacent to each other and is arranged to cross a center of the detection surface, and two band-shaped first detection regions which include a plurality of first detection elements arranged adjacent to each other and are arranged on both sides of the second detection region.

The sensor surface may have another structure comprising a second detection region which includes a plurality of second detection elements arranged adjacent to each other and is arranged at a center of the detection surface, and a first detection region which includes a plurality of first detection elements arranged adjacent to each other and is arranged to surround an entire periphery of the second detection region.

The biometric recognition unit may include a response signal generation unit which applies a predetermined supply signal to the detection element and outputs, as a response signal, a signal whose phase and amplitude have changed in accordance with an impedance of the object which is in contact through the detection element, a waveform information detection unit which detects, as waveform information, one of the phase and amplitude representing a waveform of the response signal and outputs a detection signal representing the waveform information, and a biometric determination unit which determines on the basis of the waveform information contained in the detection signal whether the detection signal is a living body.

According to the present invention, a surface shape recognition sensor device comprises a plurality of capacitance detection units which are arranged in a grid shape to cause a detection element to detect a capacitance generated with respect to an object and output a capacitance signal representing a value of the capacitance, detection elements which are arranged near the capacitance detection units, a plurality of control lines which connect, of the capacitance detection units, capacitance detection units arranged in a column direction, a plurality of data lines which connect, of the capacitance detection units, capacitance detection units arranged in a row direction, a column selector which sequentially selects one of the control lines to select each capacitance detection unit connected to the control line, a first A/D conversion unit which is arranged for each data line and A/D-converts the capacitance signal, which is output from each capacitance detection unit selected by the column selector to the data line, into three-dimensional data and outputs the three-dimensional data, a row selector which sequentially selects the three-dimensional data obtained from the first A/D conversion unit for each data line and outputs the three-dimensional data as surface shape data representing a surface shape of the object, an impedance detection unit which is arranged together with a detection element as a pair in place of one of the capacitance detection units and comes into electrical contact with the object through the detection element to detect an impedance of the object and outputs a detection signal corresponding to the impedance, and a biometric determination unit which determines on the basis of the detection signal from the impedance detection unit whether the object is a living body. The biometric recognition unit comprises a response signal generation unit which applies a predetermined supply signal to the detection element and outputs, as a response signal, a signal whose phase and amplitude have changed in accordance with an impedance of the object which is in electrical contact through the detection element, and a waveform information detection unit which detects, as waveform information, one of the phase and amplitude representing a waveform of the response signal and outputs a detection signal representing the waveform information. The biometric determination unit executes determination on the basis of whether the waveform information contained in the detection signal falls within a reference range of the waveform information which indicates an authentic living body.

The device may further comprise an individual control line which is connected to the impedance detection unit, an individual data line which is connected to the impedance detection unit, a control unit which selects the impedance detection unit by selecting the individual control line, and a second A/D conversion unit which outputs, as determination data, the waveform information contained in the detection signal output from the impedance detection unit to the individual data line, wherein the impedance detection unit outputs the detection signal representing the waveform information corresponding to the impedance of the object to the individual data line in accordance with selection by the control unit through the individual control line, and the biometric determination unit executes determination on the basis of the waveform information contained in the determination data from the second A/D conversion unit.

The device may further comprise an individual control line which is connected to the impedance detection unit, and a control unit which selects the impedance detection unit by selecting the individual control line, wherein the impedance detection unit is connected to one of the data lines and outputs the detection signal representing the waveform information corresponding to the impedance of the object to the data line in accordance with selection by the control unit through the individual control line, and the biometric determination unit executes determination on the basis of the waveform information contained in determination data which is obtained by causing the first A/D conversion unit to A/D-convert the detection signal output to the data line.

The impedance detection unit may be connected to one of the control lines and one of the data lines and output the detection signal to the data line in accordance with selection by the selector, and the biometric determination unit may execute determination on the basis of the waveform information contained in determination data which is obtained by causing the first A/D conversion unit to A/D-convert the detection signal output to the data line.

The device may comprise a plurality of impedance detection units which are arranged in place of different capacitance detection units.

Effects of the Invention

According to the present invention, a first detection element having a first detection electrode connected to a surface shape detection unit and a second detection electrode connected to a common potential, and a second detection element having a first detection electrode connected to the surface shape detection unit and a second detection electrode connected to a biometric recognition unit are arranged. The surface shape detection unit detects the surface shape on the basis of individual capacitances obtained from the first and second detection elements. The biometric recognition unit executes biometric recognition on the basis of a signal corresponding to the impedance of an object connected between the second detection electrode of the second detection element and the second detection electrode of the first detection element. With this arrangement, accurate biometric recognition can be executed while suppressing a potential variation induced to the object. In addition, on-chip device formation can easily be implemented by avoiding any increase in device size due to addition of a detection electrode.

According to the present invention, the capacitance detection units for surface shape detection are arranged in a matrix together with the detection elements. In place of one of the capacitance detection units, the impedance detection unit for biometric recognition is arranged together with the detection element as a pair. With this arrangement, the interconnection which connects the detection element for biometric recognition to the impedance detection unit to drive the detection element can be very short. Since the parasitic capacitance or noise of this interconnection can be reduced, the impedance of the object can accurately be detected. Hence, a high determination accuracy can be obtained in biometric recognition.

In the impedance detection unit, a predetermined supply signal is applied to the detection element. A signal whose phase and amplitudes have changed in accordance with the impedance of the object is acquired as a response signal. Waveform information containing the phase or amplitude representing the waveform of the response signal is detected and output as a detection signal. Determination is done by the biometric determination unit on the basis of determination data obtained by A/D-converting the detection signal. For example, a resistive element or capacitive element which requires a large area is not always necessary, unlike the prior art. Waveform information representing the impedance unique to the object can be detected in detail by a very simple circuit arrangement such as a general comparator and logic circuit. Hence, size reduction of the surface shape recognition sensor device and on-chip device formation can easily be implemented. In addition, the external component such as a resistive element or capacitive element is unnecessary. Since any decrease in security level caused by the external component can be avoided, sufficient security can be obtained.

BRIEF DESCRIPTION OF DRAWINGS

FIGS. 22A to 22C are block diagrams showing the sensor structures of a fingerprint detection device according to the first prior art;

FIG. 23 is a block diagram showing the main part of the fingerprint detection device according to the first prior art.

BEST MODE FOR CARRYING OUT THE INVENTION

The embodiments of the present invention will be described next with reference to the accompanying drawings.

Figure 1:
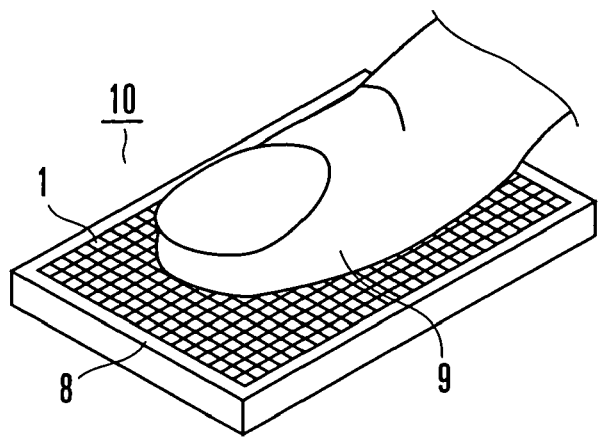
FIG. 1 is a perspective view showing the outer appearance of a surface shape recognition sensor device according to an embodiment of the present invention.

FIG. 1 is a perspective view showing the outer appearance of a surface shape recognition sensor device according to an embodiment of the present invention. This surface shape recognition sensor device is used as a circuit device which detects the surface shape of an object in a surface shape recognition device which authenticates an object by comparing and collating the shape of the collation target surface of the object having, e.g., a fine three-dimensional pattern with collation data. As shown in FIG. 1, a surface shape recognition sensor device 10 includes a number of fine detection elements 1 arranged two-dimensionally (in an array or grid shape) on an LSI chip.

When an object 9 such as a finger is brought into contact with a sensor surface 8 of the surface shape recognition sensor device 10, the surface of the object 9, and in this case, the three-dimensional shape of the fingerprint is individually detected through each detection element 1, and surface shape data representing the surface shape of the object is output.

In the present invention, biometric recognition is executed by using the detection elements 1 for surface shape detection.

FIRST EMBODIMENT

Figure 2:
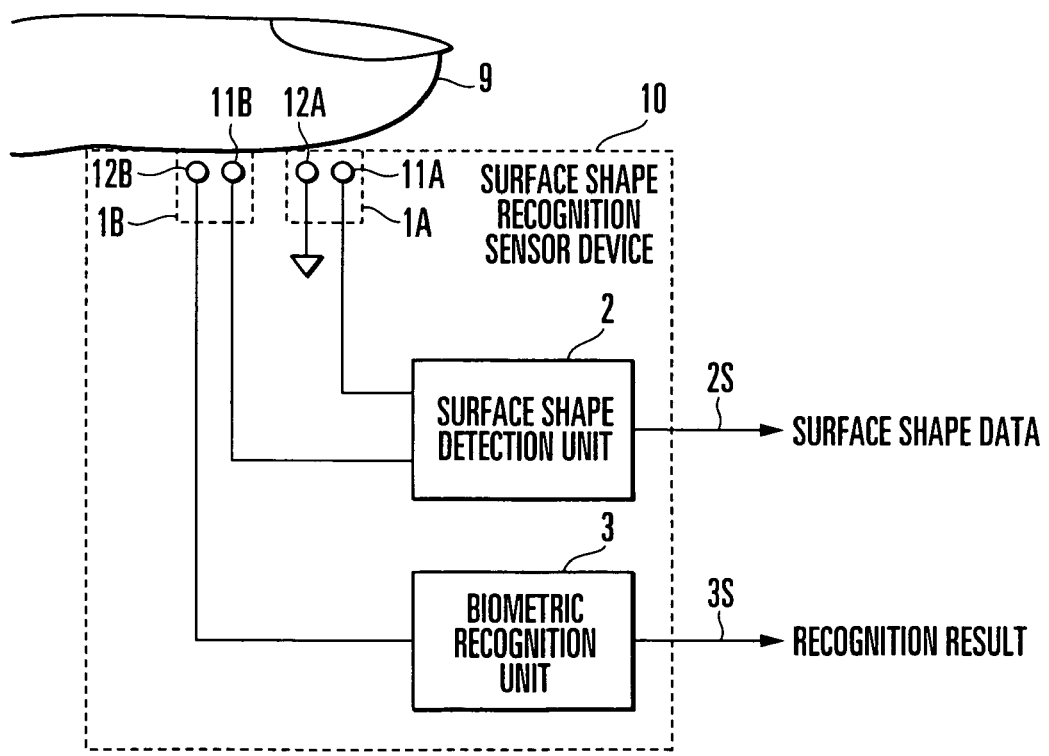
FIG. 2 is a block diagram showing the arrangement of a surface shape recognition sensor device according to the first embodiment of the present invention.

A surface shape recognition sensor device according to the first embodiment of the present invention will be described next with reference to FIG. 2. FIG. 2 is a block diagram showing the arrangement of the surface shape recognition sensor device according to the first embodiment of the present invention.

A surface shape recognition sensor device 10 includes detection elements 1A and 1B, surface shape detection unit 2, and biometric recognition unit 3.

The detection element 1A has a detection electrode 11A which forms an electrostatic capacitance with respect to an object 9 through an insulating film, and a detection electrode 12A which comes into electrical contact with the object 9. The detection electrode 11A is connected to the surface shape detection unit 2. The detection electrode 12A is connected to a common potential such as a ground potential. The common potential is supplied from a predetermined supply circuit unit (not shown) such as a power supply circuit at a predetermined potential (low impedance). The detection element 1B has a detection electrode 11B which forms an electrostatic capacitance with respect to the object 9 through the insulating film, and a detection electrode 12B which comes into electrical contact with the object 9. The detection electrode 11B is connected to the surface shape detection unit 2. The detection electrode 12B is connected to the biometric recognition unit 3.

The surface shape detection unit 2 is a circuit unit which outputs surface shape data 2S representing the three-dimensional shape of the surface of the object 9 on the basis of the electrostatic capacitances generated between the object 9 and the detection electrodes 11A and 11B of the detection elements 1A and 1B.

The biometric recognition unit 3 is a circuit unit which determines whether the object 9 is a living body, on the basis of the impedance of the object 9 connected between the detection electrode 12B of the detection element 1B and the detection electrode 12A of the detection element 1A.

The operation of the surface shape recognition sensor device according to this embodiment will be described next. The surface shape recognition sensor device 10 has, as operations, the surface shape detection operation of detecting the surface shape of the object 9 and biometric recognition operation of executing biometric recognition of the object 9. One of these operations is selectively executed under the control of a host apparatus (not shown).

In the surface shape detection operation, on the basis of the magnitude of the electrostatic capacitance formed between the object 9 and the detection electrode 11A of the detection element 1A, the surface shape detection unit 2 generates a signal representing the surface shape of the object 9 at the position of the detection element 1A and outputs the signal as the surface shape data 2S.

Even for the detection element 1B, on the basis of the magnitude of the electrostatic capacitance formed between the object 9 and the detection electrode 11B, the surface shape detection unit 2 generates the surface shape data 2S representing the three-dimensional shape of the surface of the object 9 and outputs the data as the surface shape data 2S.

Since the object 9 is connected to the common potential through the detection electrode 12A of the detection element 1A, the electrostatic capacitances formed by the detection electrodes 11A and 11B stabilize, and the surface shape data 2S with minimum noise is obtained.

On the other hand, in the biometric recognition operation, since the object 9 is connected to the common potential through the detection electrode 12A of the detection element 1A, a current path is formed from the detection electrode 12B of the detection element 1B to the detection electrode 12A of the detection element 1A, i.e., the common potential through the object 9.

On the basis of whether the impedance value unique to the object 9 present in the current path falls within a reference range which indicates the impedance of an authentic living body, the biometric recognition unit 3 determines whether the object 9 is a living body.

At this time, the biometric recognition unit 3 executes biometric recognition by using a signal which changes depending on the impedance of the object 9. Since the object 9 is connected to the common potential through the detection electrode 12A of the detection element 1A, the potential variation by induction to the object 9 is suppressed. Hence, a stable signal is obtained, and accurate biometric recognition is implemented.

As described above, in this embodiment, the detection element 1A having the detection electrode 11A connected to the surface shape detection unit 2 and the detection electrode 12A connected to the common potential and the detection element 1B having the detection electrode 11B connected to the surface shape detection unit 2 and the detection electrode 12B connected to the biometric recognition unit 3 are arranged. The surface shape detection unit 2 outputs the signals representing the three-dimensional patterns of surface shapes corresponding to the contact positions to the detection elements 1A and 1B on the basis of the capacitances obtained from the detection elements 1A and 1B. The biometric recognition unit 3 determines whether the object 9 is a living body on the basis of the signal corresponding to the impedance of the object 9 connected between the detection electrode 12B of the detection element 1B and the detection electrode 12A of the detection element 1A.

Since the object 9 is connected to the common potential through the detection electrode 12A of the detection element 1A, accurate biometric recognition can be executed by suppressing the potential variation induced to the object 9. In addition, surface shape data with minimum noise can be obtained.

Since the detection elements are used for both the surface shape detection operation and the biometric recognition operation, no detection element for biometric recognition need be arranged independently of the detection elements to detect the surface shape. Hence, any increase in layout area and manufacturing cost per chip can be avoided. Biometric recognition can be executed in addition to surface shape detection of the object without increasing the device size. Accordingly, on-chip device formation can easily be implemented.

In the example shown in FIG. 1, one detection element 1A and one detection element 1B are used. However, this is a minimum arrangement necessary for executing biometric recognition, and the present invention is not limited to this. Actually, a number of detection elements 1A are used to obtain the surface shape data representing the surface shape of the object 9 by the surface shape detection unit 2. In addition, a number of detection elements 1B are used to stably detect the impedance of the object 9 by the biometric recognition unit 3.

[Arrangement of Surface Shape Detection Unit]

Figure 3:
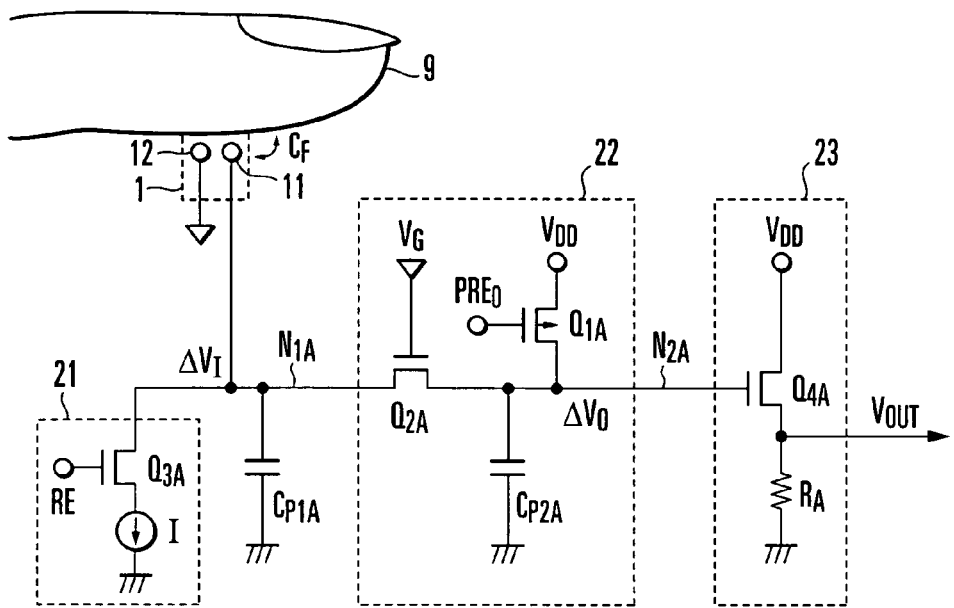
FIG. 3 is a circuit diagram showing the arrangement of a sensor cell used in a surface shape detection unit shown in FIG. 2.
Figure 4A:
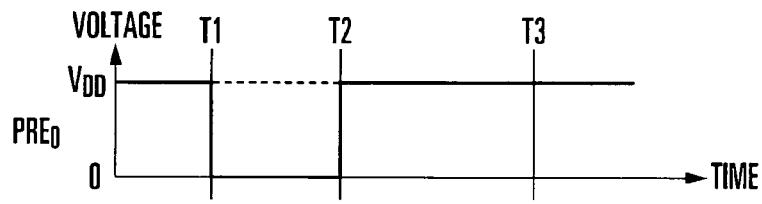
FIGS. 4A to 4C are timing charts showing the waveforms of signals of the respective parts shown in FIG. 3.
Figure 4B:
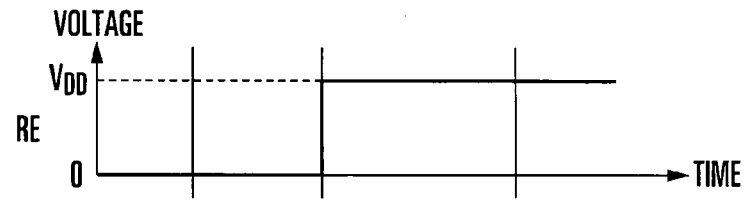
Figure 4C:
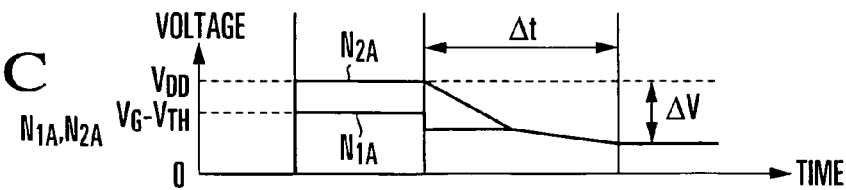

The detailed arrangement of the surface shape detection unit 2 used in the surface shape recognition sensor device according to this embodiment will be described next with reference to FIGS. 3 and 4A to 4C. FIG. 3 is a circuit diagram showing the arrangement of a sensor cell used in the surface shape detection unit 2. FIGS. 4A to 4C are timing charts showing the signals of the respective parts shown in FIG. 3. A known technique (e.g., Japanese Patent Laid-Open No. 2000-28311) is used for the detailed example of the surface shape detection unit 2.

In the surface shape detection unit 2, a sensor cell which converts a capacitance detected in accordance with the surface shape of the object 9 by a detection element 1 into a predetermined output signal is arranged for each detection element 1. The sensor cell includes a signal generation circuit 21 which generates a signal corresponding to the capacitance of the detection element 1, a signal amplification circuit 22 which amplifies the level of the signal by the signal generation circuit 21 and outputs the signal, and an output circuit 23 which converts the output signal from the signal amplification circuit 22 into a desired signal and outputs it.

Referring to FIG. 3, an electrostatic capacitance $C_F$ is formed between a detection electrode 11 and the object 9. At a node $N_{1A}$, a voltage signal $\Delta V_I$ corresponding to $C_F$ is generated by the signal generation circuit 21. The voltage signal $\Delta V_I$ is amplified to a voltage signal $\Delta V_0$ by the signal amplification circuit 22. A voltage signal $V_{OUT}$ corresponding to the magnitude of the voltage signal $\Delta V_0$ is output from the output circuit 23 as the output signal. Reference symbols $C_{P1A}$ and $C_{P2A}$ denote parasitic capacitances.

As shown in FIGS. 4A to 4C, before time T1, a sensor circuit control signal $PRE_0$ is controlled to a power supply voltage $V_{DD}$ so that $Q_{1A}$ is turned off. A sensor circuit control signal RE is controlled to a voltage of 0 V so that $Q_{3A}$ is OFF, and the node $N_{1A}$ is set to 0 V. At the time T1, the signal $PRE_0$ is controlled to 0 V so that $Q_{1A}$ is turned on. A node $N_{2A}$ rises to $V_{DD}$, and the node $N_{1A}$ rises to a value less than a bias voltage $V_G$ by a threshold voltage $V_{TH}$ of $Q_{2A}$. At time T2, the signals $PRE_0$ and RE are controlled to $V_{DD}$ so that $Q_{1A}$ is turned off, and $Q_{3A}$ is turned on. Accordingly, the charges stored in the capacitances $C_F$ and $C_{P1A}$ are discharged, and the potential of the node $N_{1A}$ decreases.

During only the period when the potential of the node $N_{2A}$ is sufficiently high, the charges stored in the capacitance $C_{P2A}$ are abruptly discharged. When the potential of the node $N_{2A}$ decreases to almost the potential of the node $N_{1A}$, the potentials of the nodes $N_{1A}$ and $N_{2A}$ gradually decrease. At time T3 after the elapse of $\Delta t$ from the time T2, the signal RE is controlled to 0 V to turn off $Q_{3A}$. The potential $V_{DD}-\Delta V$ of the node $N_{2A}$ at that time is maintained, amplified, and output as $V_{OUT}$. Accordingly, the voltage $\Delta V_{OUT}$ corresponding to the value of the electrostatic capacitance $C_F$ is obtained. When this voltage signal is processed, the three-dimensional pattern of the surface shape can be recognized.

[Arrangement of Biometric Recognition Unit]

Figure 5:
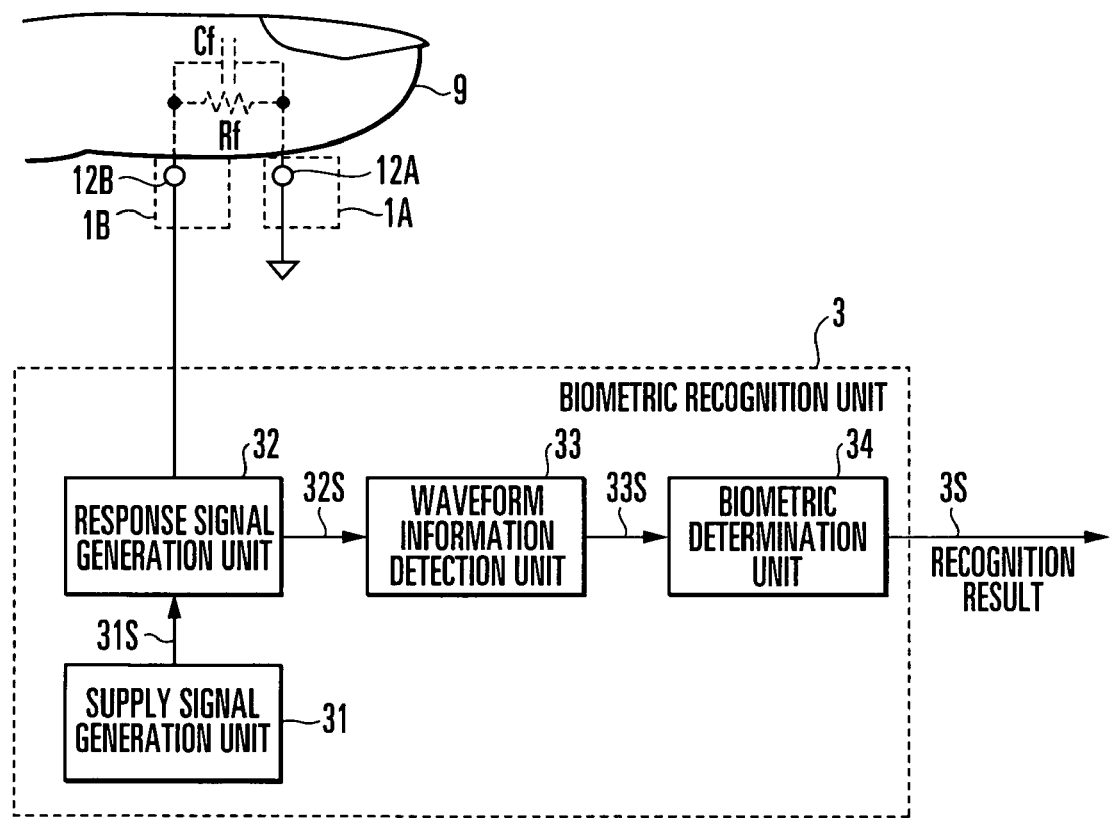
FIG. 5 is a block diagram showing the arrangement of a biometric recognition unit shown in FIG. 2.
Figure 6A:
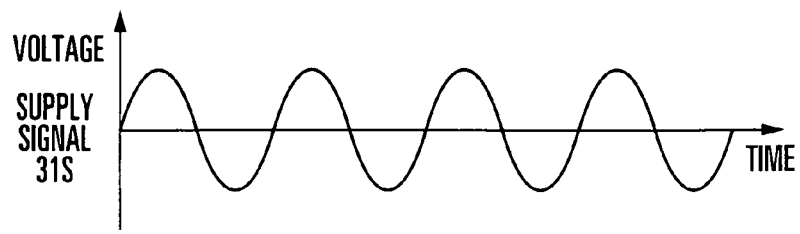
FIGS. 6A to 6D are timing charts showing signal waveforms in phase difference detection by the biometric recognition unit shown in FIG. 5.
Figure 6B:
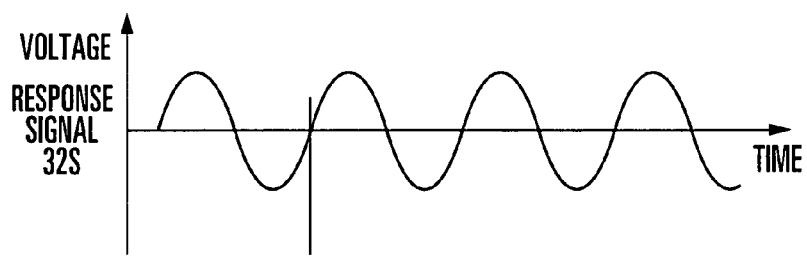
Figure 6C:
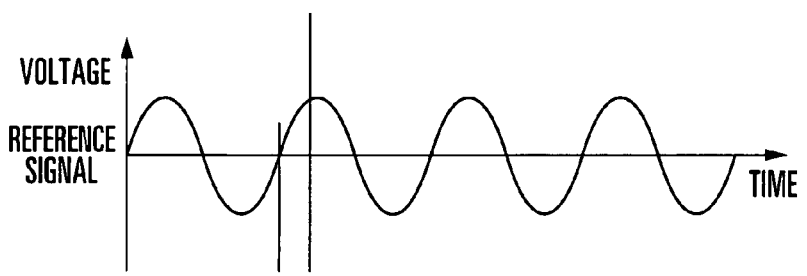
Figure 6D:
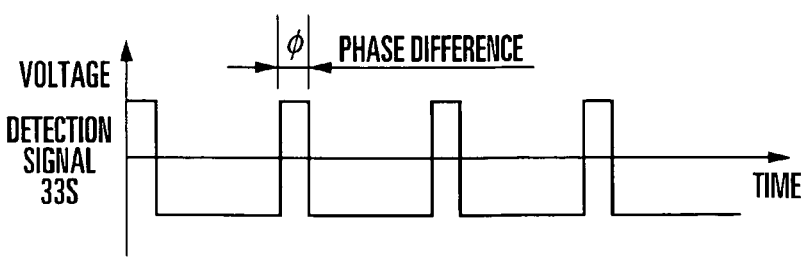

The detailed arrangement of the biometric recognition unit 3 used in the surface shape recognition sensor device according to this embodiment will be described next with reference to FIG. 5. FIG. 5 is a block diagram showing the arrangement of the biometric recognition unit.

The biometric recognition unit 3 includes a supply signal generation unit 31, response signal generation unit 32, waveform information detection unit 33, and biometric determination unit 34.

The detection elements 1A and 1B come into electrical contact with the object 9 through the detection electrodes 12A and 12B to connect a capacitance component Cf and resistance component Rf of the impedance of the object 9 to the response signal generation unit 32. The supply signal generation unit 31 generates a supply signal 31S such as a sine wave of a predetermined frequency and outputs it to the response signal generation unit 32. The response signal generation unit 32 supplies the supply signal 31S from the supply signal generation unit 31 to the detection electrode 12B of the detection element 1B and outputs, to the waveform information detection unit 33, a response signal 32S which changes depending on the output impedance of the detection element 1B, i.e., the capacitance component and resistance component of the impedance of the object 9.

The waveform information detection unit 33 detects the amplitude or the phase difference of the supply signal 31S on the basis of the waveform indicated by the response signal 32S from the response signal generation unit 32 and outputs, to the biometric determination unit 34, a detection signal 33S containing waveform information representing the phase difference or amplitude. On the basis of the waveform information contained in the detection signal 33S from the waveform information detection unit 33, the biometric determination unit 34 determines whether the object 9 is a living body, and outputs a recognition result 3S.

When the object 9 comes into contact with the detection elements 1A and 1B, the supply signal 31S applied from the supply signal generation unit 31 to the detection elements 1A and 1B changes depending on the impedance characteristic, i.e., the capacitance component and resistance component unique to the object 9 and is output from the response signal generation unit 32 as the response signal 32S. The waveform information detection unit 33 detects the amplitude or phase difference of the response signal 32S. The detection signal 33S containing the information representing the detection result is output to the biometric determination unit 34.

FIGS. 6A to 6D show examples of signal waveforms in phase difference detection. When a sine wave with its center at the common potential such as the ground potential is used as the supply signal 31S, the phase of the response signal 32S changes in accordance with the impedance of the object 9. When a signal synchronized with the supply signal 31S is used as the reference signal, and its phase is compared with the phase of the response signal 32S by the waveform information detection unit 33, the detection signal 33S having a pulse width corresponding to, e.g., a phase difference $\phi$ is output.

On the basis of whether the information of the phase difference, i.e., capacitance component (imaginary component) contained in the detection signal 33S falls within the reference range of the phase difference of an authentic living body, the biometric determination unit 34 determines whether the object 9 is a living body.

Figure 7A:
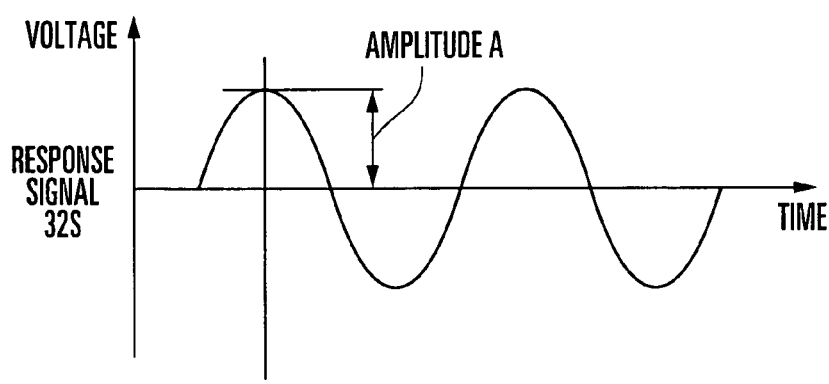
FIGS. 7A and 7B are timing charts showing signal waveforms in amplitude detection by the biometric recognition unit shown in FIG. 5.
Figure 7B:
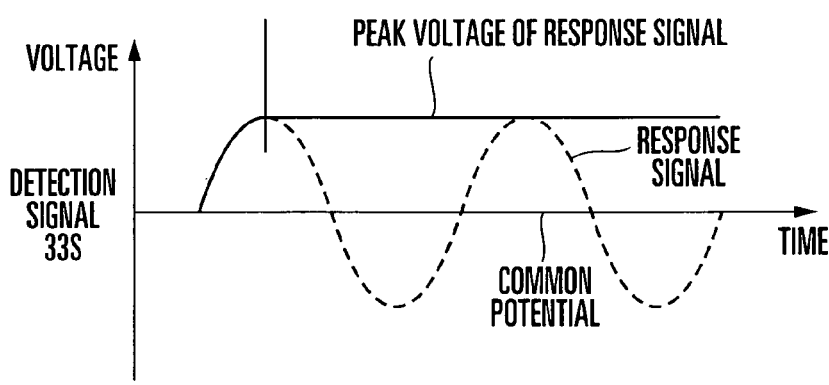

FIGS. 7A and 7B show examples of signal waveforms in amplitude detection. When a sine wave with its center at the common potential such as the ground potential is used as the supply signal 31S, the response signal 32S changes to an amplitude corresponding to the impedance of the object 9 with the center at the common potential. The waveform information detection unit 33 detects the peak voltage of the response signal 32S, i.e., the maximum or minimum value of the voltage, and outputs the detection signal 33S representing a DC potential proportional to an amplitude A of the response signal 32S.

On the basis of whether the information of the amplitude, i.e., resistance component (real component) contained in the detection signal 33S falls within the reference range of the amplitude of an authentic living body, the biometric determination unit 34 determines whether the object 9 is a living body.

Biometric recognition can be done by detecting only one of the phase difference and amplitude. For example, a resistive element or capacitive element which requires a large area is not always necessary, unlike the prior art. Information representing the impedance unique to the object 9 can be detected in detail by a very simple circuit arrangement such as a phase comparison circuit using a general comparator and logic circuit. Hence, size reduction of the surface shape recognition sensor device and on-chip device formation can easily be implemented.

Biometric recognition may be executed by detecting both the phase difference and amplitude. As compared to a case in which biometric recognition/determination is done by using information obtained by detecting the real and imaginary components together, it is very difficult to individually adjust the real and imaginary components by selecting the material or material properties of the object. Hence, a high level of security can be obtained against an illicit recognition behavior by using an artificial finger.

[Arrangement of Detection Element]

Figure 8A:
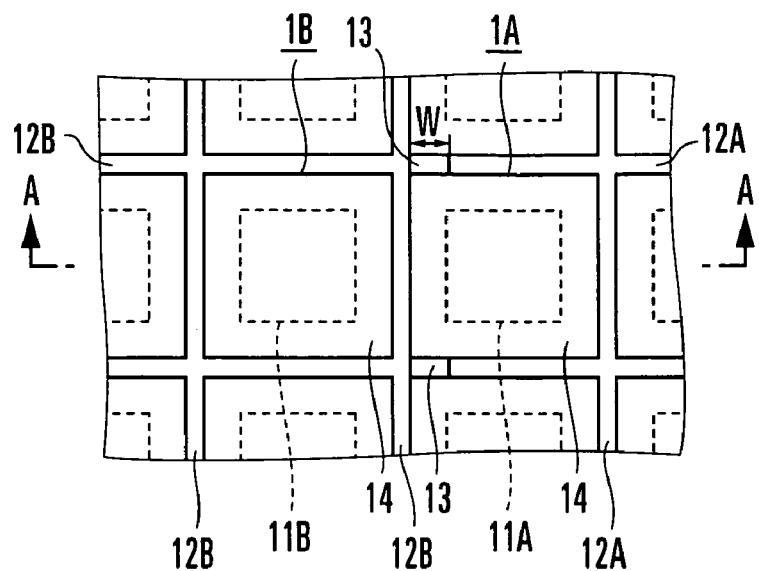
FIGS. 8A and 8B are explanatory views showing the arrangement of detection elements shown in FIG. 2.
Figure 8B:
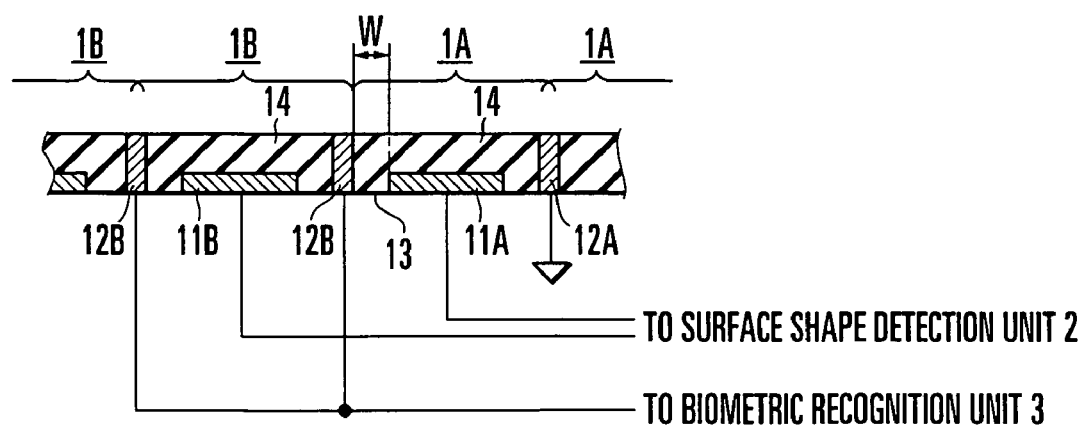

The detailed arrangement of the detection elements used in the surface shape recognition sensor device according to this embodiment will be described next with reference to FIGS. 8A and 8B. FIGS. 8A and 8B are explanatory views showing the arrangement of the detection elements. FIG. 8A is a front view, and FIG. 8B is a sectional view taken along a line A-A in FIG. 8A.

Each detection element 1A includes the detection electrode 11A which is arrayed in a grid shape on a sensor surface 8 of the surface shape recognition sensor device 10 and the detection electrode 12A which is formed into a wall shape at a position spaced apart from the detection electrode 11A to surround it. Similarly, each detection element 1B includes the detection electrode 11B which is arrayed in a grid shape and the detection electrode 12B which is formed into a wall shape at a position spaced apart from the detection electrode 11B to surround it.

The detection electrodes 11A and 11B are formed from a metal film. The upper side of the detection electrodes in the vicinity of the object 9 is covered with an insulating film 14. Each detection electrode forms a capacitive element together with the object 9 serving as a counter detection electrode. At this time, since the distance between the detection electrodes changes depending on the three-dimensional pattern of the surface shape of the object, an electrostatic capacitance corresponding to the three-dimensional pattern of the surface shape is formed.

On the other hand, the upper side of the detection electrodes 12A and 12B is exposed and comes into contact with the object 9. Accordingly, the common potential connected to the detection electrode 12A is applied to the object 9. In addition, the impedance of the object 9 is connected to the biometric recognition unit 3 through the detection electrode 12B.

At this time, the detection electrodes 12A and 12B are shared by the adjacent detection elements 1A and 1B, respectively. A notch 13 is formed between the detection electrodes 12A and 12B at the boundary, where the detection elements 1A and 1B are arranged adjacent, to electrically insulate the detection electrodes from each other.

When the length of one side of the detection elements 1A and 1B is several ten μm, a width W of the notch 13 is set to 20 μm or less. In this case, the presence of the notch 13 cannot visually be recognized. Hence, the presence/absence of the biometric recognition detection elements and their layout positions can be made invisible, and the security level can be increased.

SECOND EMBODIMENT

Figure 9:
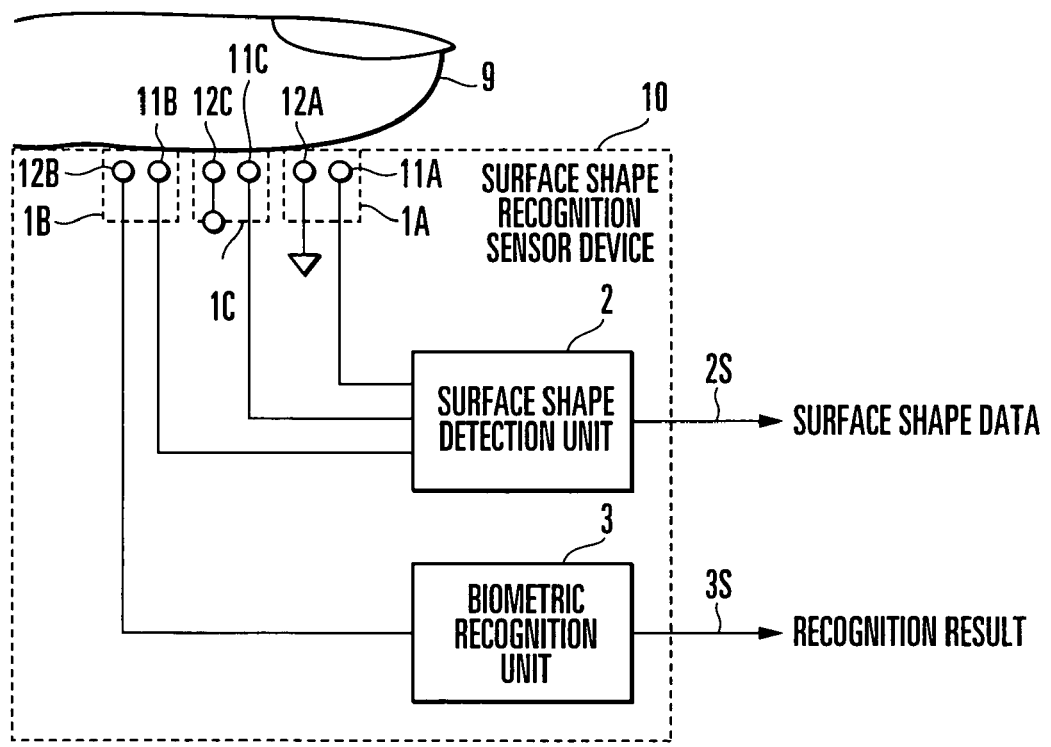
FIG. 9 is a block diagram showing the arrangement of a surface shape recognition sensor device according to the second embodiment of the present invention.

A surface shape recognition sensor device according to the second embodiment of the present invention will be described next with reference to FIG. 9. FIG. 9 is a block diagram showing the arrangement of the surface shape recognition sensor device according to the second embodiment of the present invention.

In a surface shape recognition sensor device 10, a detection element 1C is arranged between a detection element 1A and a detection element 1B, unlike the above-described first embodiment (FIG. 2). The remaining parts are the same as in the above-described first embodiment. The same reference numerals as in FIG. 2 denote the same or similar parts in FIG. 9.

The detection element 1C has a detection electrode 11C which forms an electrostatic capacitance with respect to an object 9 through an insulating film, and a detection electrode 12C which comes into electrical contact with the object 9, like the above-described detection elements 1A and 1B. The detection electrode 11C is connected to a surface shape detection unit 2. The detection electrode 12C is insulated from the remaining potentials. The detection electrode 12C is set in a high-impedance (floating) state so that the detection electrode 12C is not connected to any potential.

The surface shape detection unit 2 outputs surface shape data 2S representing the three-dimensional shape of the surface of the object 9 on the basis of the electrostatic capacitances generated between detection electrodes 11A, 11B, and 11C of the detection elements 1A, 1B, and 1C.

The biometric recognition unit 3 determines whether the object 9 is a living body on the basis of the impedance of the object 9 connected between a detection electrode 12B of the detection element 1B and a detection electrode 12A of the detection element 1A.

Since the detection element 1C is arranged between the detection electrode 12A and the detection electrode 12B, the distance between them is long. In addition, since the detection electrode 12C which comes into electrical contact with the object 9 is set in the high-impedance state, the impedance of the object 9 connected between the detection electrode 12A and the detection electrode 12B is higher than that obtained when the two detection electrodes are laid out adjacent. Hence, the change amount of the impedance which changes depending on the object 9 increases, and the determination accuracy by the biometric recognition unit 3 can be increased.

In the example shown in FIG. 9, one detection element 1A, one detection element 1B, and one detection element 1C are used. However, this is a minimum arrangement necessary for executing biometric recognition, and the present invention is not limited to this. Actually, a number of detection elements 1A are used to obtain the surface shape data representing the surface shape of the object 9 by the surface shape detection unit 2. In addition, a number of detection elements 1B are used to stably detect the impedance of the object 9 by the biometric recognition unit 3. Furthermore, a number of detection elements 1C laid out adjacent are used to increase the change amount of the impedance which changes depending on the object 9.

[Arrangement of Detection Element]

Figure 10A:
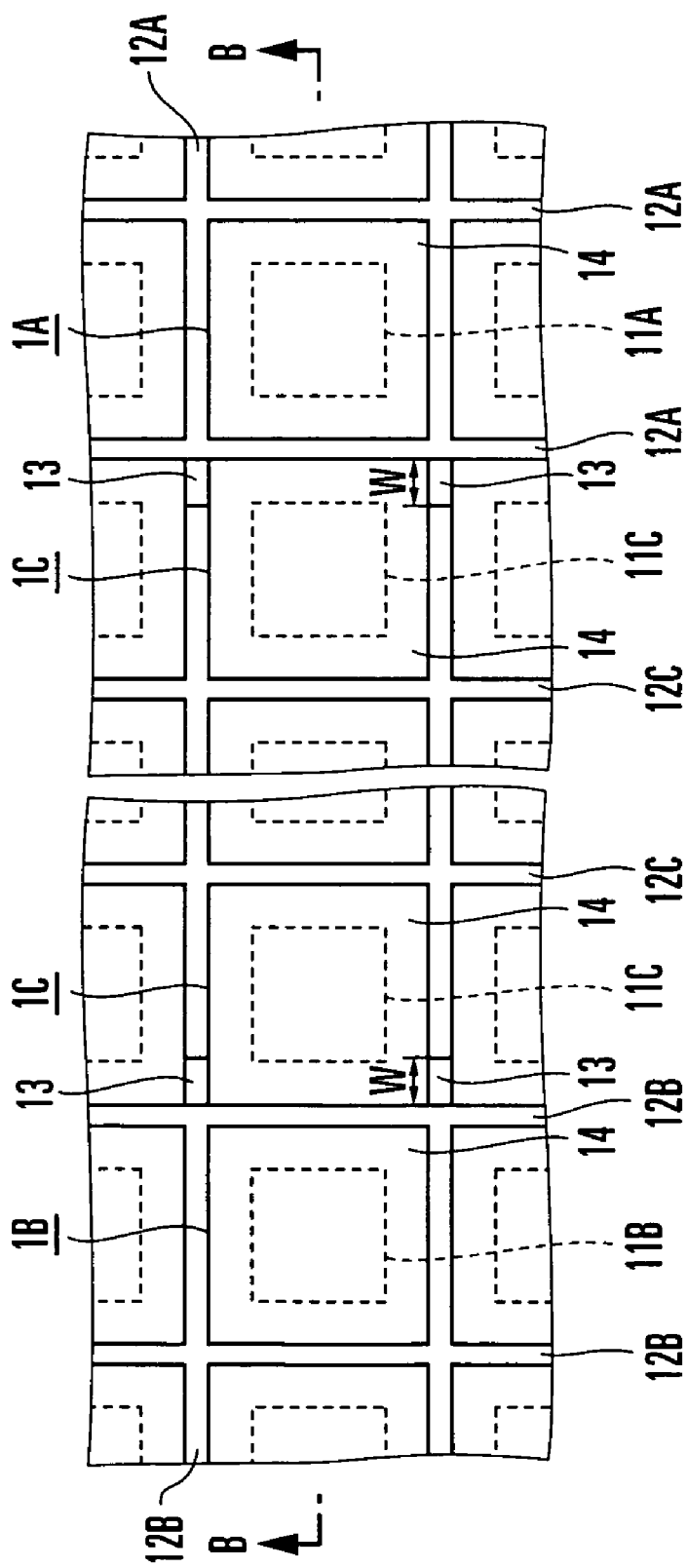
FIGS. 10A and 10B are explanatory views showing the arrangement of detection elements shown in FIG. 9.
Figure 10B:
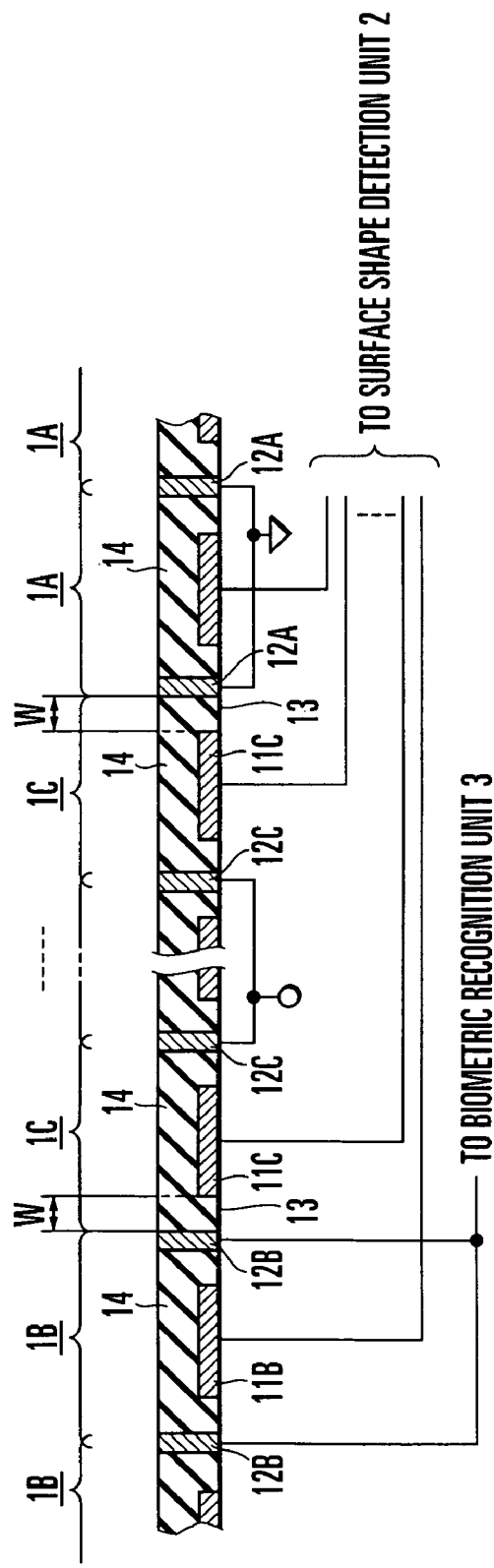

The detailed arrangement of the detection elements used in the surface shape recognition sensor device according to this embodiment will be described next with reference to FIGS. 10A and 10B. FIGS. 10A and 10B are explanatory views showing the arrangement of the detection elements. FIG. 10A is a front view, and FIG. 10B is a sectional view taken along a line B-B in FIG. 10A.

Each detection element 1A includes the detection electrode 11A which is arrayed in a grid shape on a sensor surface 8 of the surface shape recognition sensor device 10 and the detection electrode 12A which is formed into a wall shape at a position spaced apart from the detection electrode 11A to surround it. Similarly, each detection element 1B includes the detection electrode 11B which is arrayed in a grid shape and the detection electrode 12B which is formed into a wall shape at a position spaced apart from the detection electrode 11B to surround it. The detection electrode 11C includes the detection electrode 11C arrayed in a grid shape and the detection electrode 12C which is formed into a wall shape at a position spaced apart from the detection electrode 11C to surround it.

The detection electrodes 11A, 11B, and 11C are formed from a metal film. The upper side of the detection electrodes in the vicinity of the object 9 is covered with an insulating film 14. Each detection electrode forms a capacitive element together with the object 9 serving as a counter detection electrode. At this time, since the distance between the detection electrodes changes depending on the three-dimensional pattern of the surface shape of the object, an electrostatic capacitance corresponding to the three-dimensional pattern of the surface shape is formed.

On the other hand, the upper side of the detection electrodes 12A, 12B, and 12C is exposed and comes into contact with the object 9. Accordingly, the common potential connected to the detection electrode 12A is applied to the object 9. In addition, the impedance of the object 9 is connected to the biometric recognition unit 3 through the detection electrode 12B.

At this time, the detection electrodes 12A, 12B, and 12C are shared by the adjacent detection elements 1A, 1B, and 1C, respectively. A notch 13 is formed between the detection electrodes 12A and 12C and between the detection electrodes 12B and 12C at the boundaries, where the detection elements 1C and the detection elements 1A and 1B are arranged adjacent, to electrically insulate the detection electrodes from each other.

When the length of one side of the detection elements 1A, 1B, and 1C is several ten μg, a width W of the notch 13 is set to 20 μm or less. In this case, the presence of the notch 13 cannot visually be recognized. Hence, the presence/absence of the biometric recognition detection elements and their layout positions can be made invisible, and the security level can be increased.

THIRD EMBODIMENT

Figure 11:
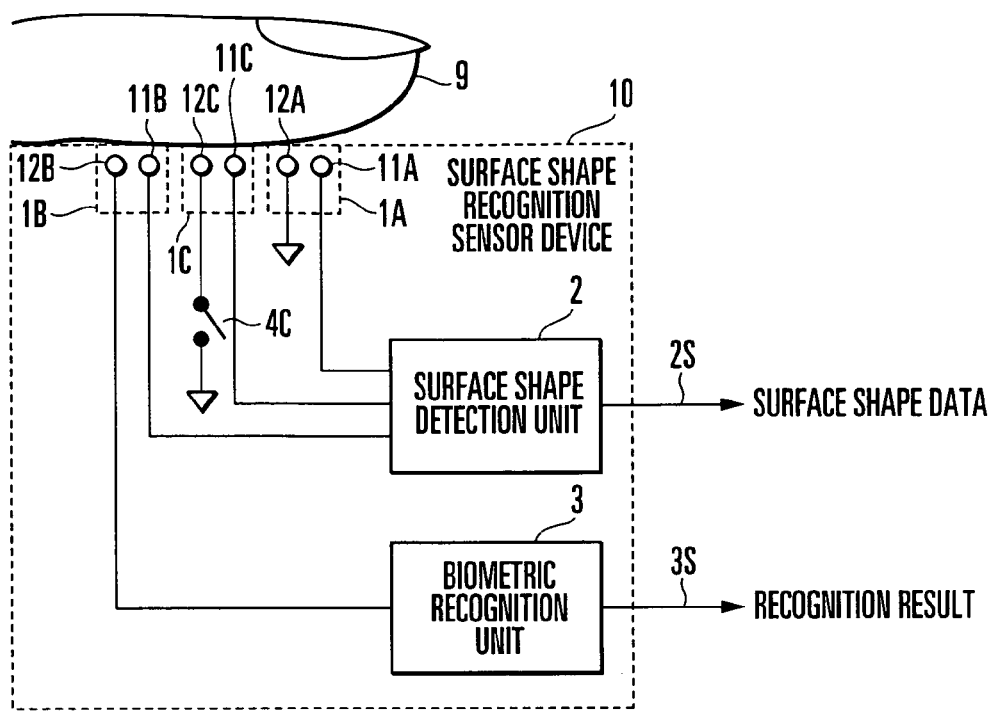
FIG. 11 is a block diagram showing the arrangement of a surface shape recognition sensor device according to the third embodiment of the present invention.

A surface shape recognition sensor device according to the third embodiment of the present invention will be described next with reference to FIG. 11. FIG. 11 is a block diagram showing the arrangement of the surface shape recognition sensor device according to the third embodiment of the present invention.

In a surface shape recognition sensor device 10, a switch 4C is arranged between the common potential and a detection electrode 12C of a detection element 1C, unlike the above-described second embodiment (FIG. 9). The remaining parts are the same as in the above-described second embodiment. The same reference numerals as in FIG. 9 denote the same or similar parts in FIG. 11.

When a surface shape detection unit 2 executes the surface shape detection operation, the switch 4C is short-circuited to apply the common potential to the detection electrode 12C of the detection element 1C. When a biometric recognition unit 3 executes the biometric recognition operation, the switch 4C is opened to set the detection electrode 12C of the detection element 1C in a high-impedance state.

Unlike the second embodiment, in the surface shape detection operation, the detection electrode 12C of the detection element 1C is also connected to the common potential, like the detection electrode 11A of the detection element 1A. Since clear surface shape data with minimum noise can be obtained, the authentication accuracy of personal authentication processing using the surface shape data in the subsequent stage can be increased.

FOURTH EMBODIMENT

Figure 12:
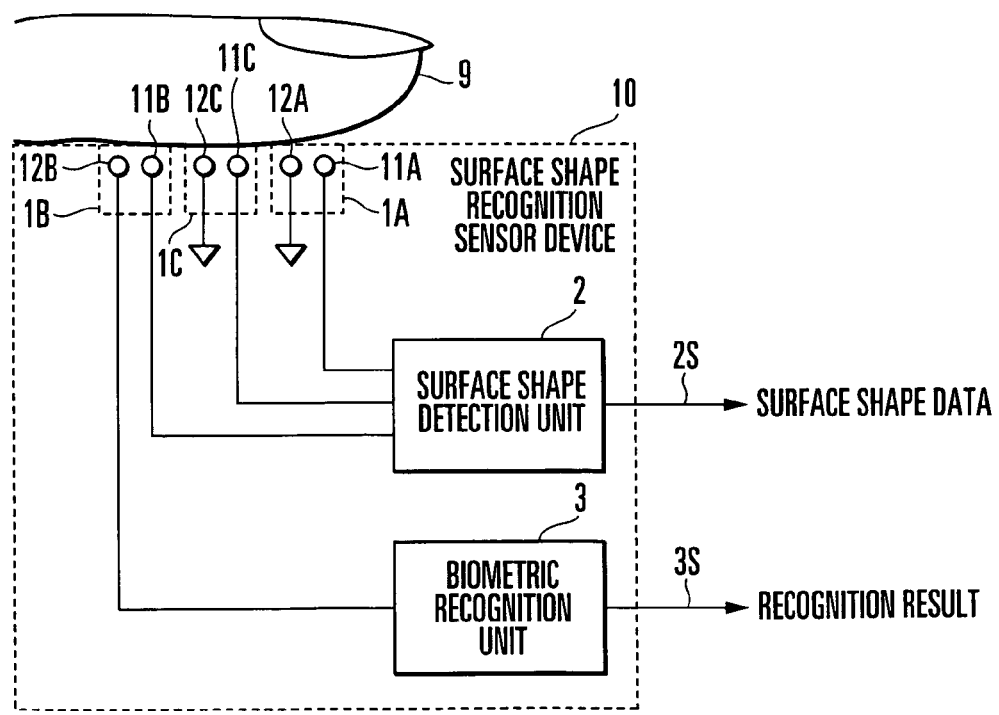
FIG. 12 is a block diagram showing the arrangement of a surface shape recognition sensor device according to the fourth embodiment of the present invention.
Figure 13A:
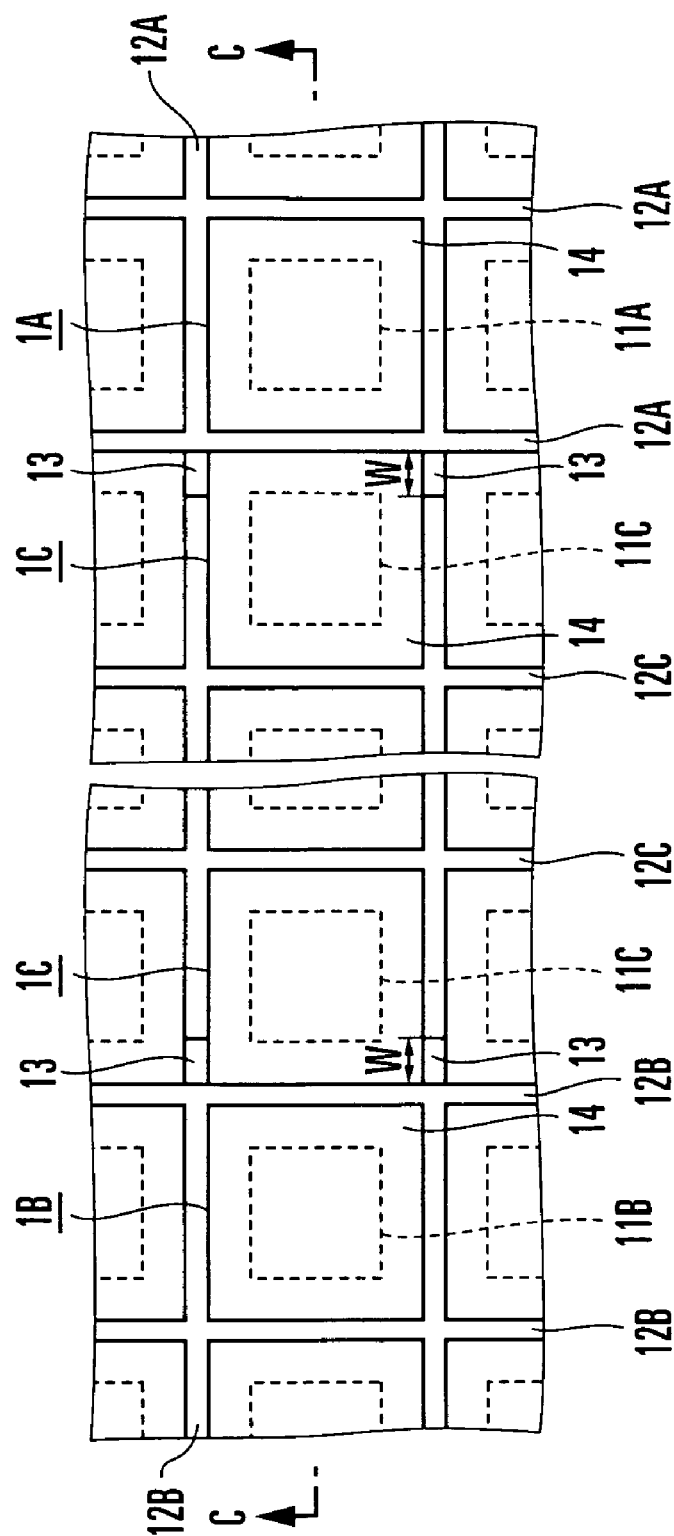
FIGS. 13A and 13B are explanatory views showing the arrangement of detection elements shown in FIG. 12.
Figure 13B:
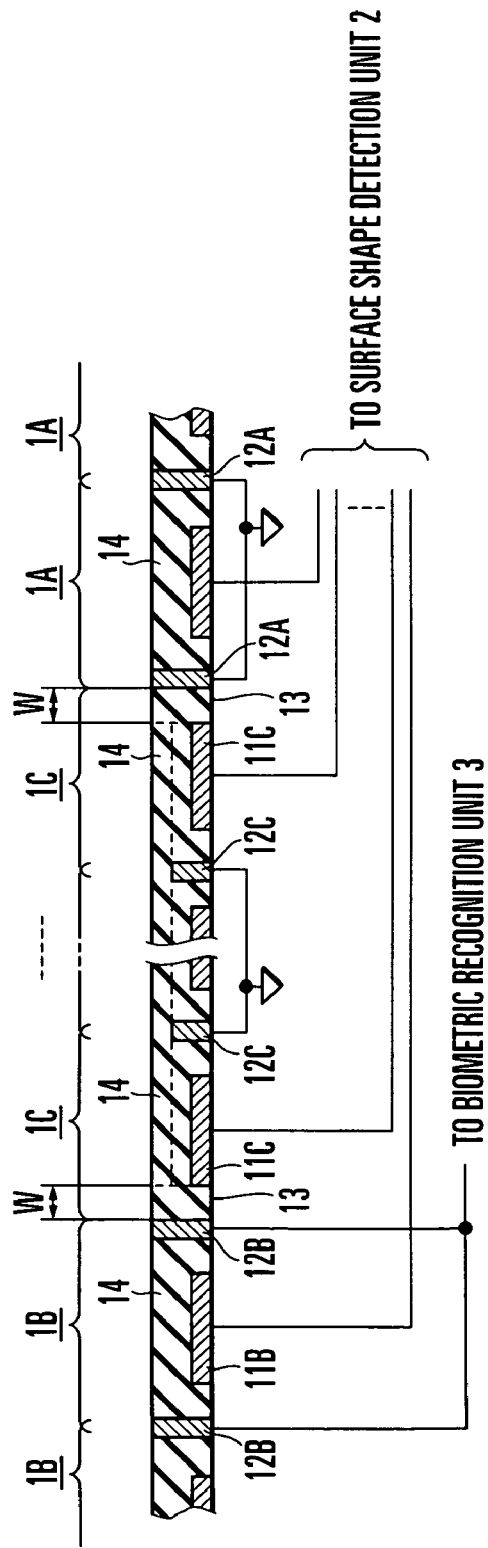

A surface shape recognition sensor device according to the fourth embodiment of the present invention will be described next with reference to FIGS. 12, 13A, and 13B. FIG. 12 is a block diagram showing the arrangement of the surface shape recognition sensor device according to the fourth embodiment of the present invention. FIGS. 13A and 13B are explanatory views showing the arrangement of detection elements used in the surface shape recognition sensor device according to the fourth embodiment of the present invention. FIG. 13A is a front view, and FIG. 13B is a sectional view taken along a line C-C.

In a surface shape recognition sensor device 10, an insulating film 14 is formed not only on the upper side of a detection electrode 11C of a detection element 1C but also on the upper side of a detection electrode 12C, unlike the above-described second embodiment (FIG. 9). In addition, the detection electrode 12C is connected to the common potential. The remaining parts are the same as in the above-described second embodiment. The same reference numerals as in FIG. 9 denote the same or similar parts in FIG. 12.

Since the detection electrode 12C of the detection element 1C is covered with the insulating film 14, the detection electrode 12C is electrically insulated from an object 9. Hence, the common potential can always be applied to the detection electrode 12C. Since clear surface shape data with minimum noise can be obtained without using the switch 4C of the above-described third embodiment (FIG. 11), the authentication accuracy of personal authentication processing using the surface shape data in the subsequent stage can be increased.

FIFTH EMBODIMENT

Figure 14:
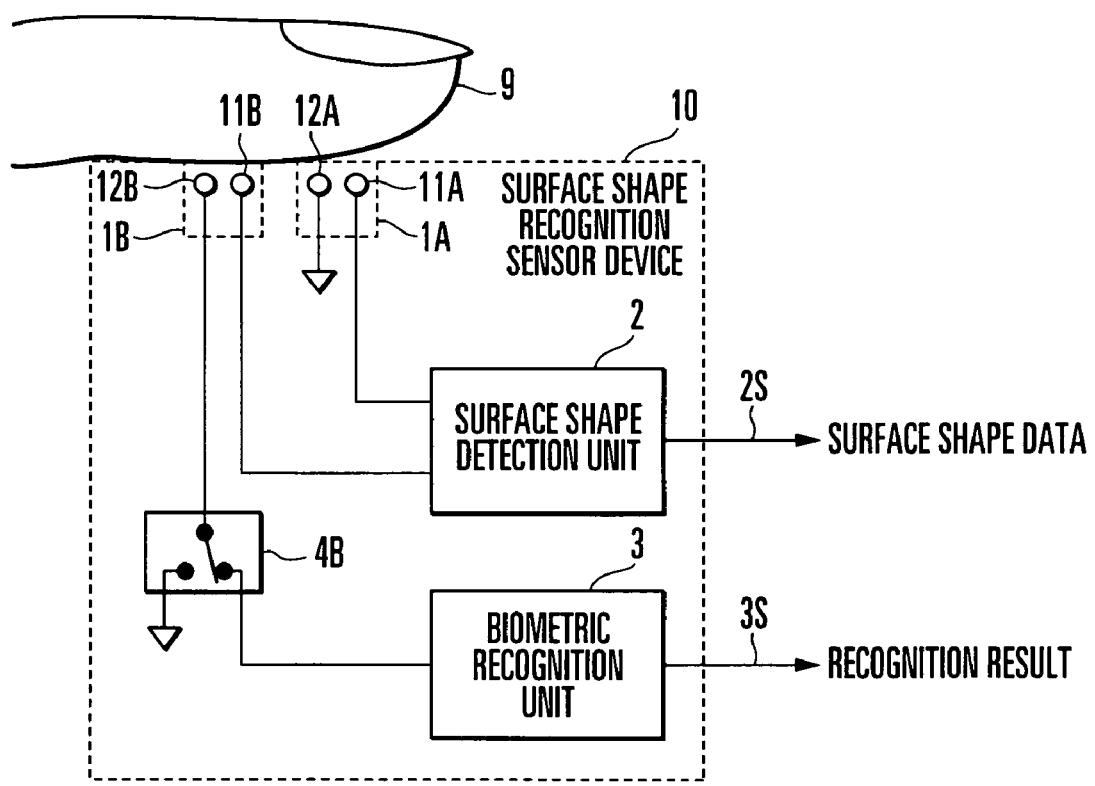
FIG. 14 is a block diagram showing the arrangement of a surface shape recognition sensor device according to the fifth embodiment of the present invention.

A surface shape recognition sensor device according to the fifth embodiment of the present invention will be described next with reference to FIG. 14. FIG. 14 is a block diagram showing the arrangement of the surface shape recognition sensor device according to the fifth embodiment of the present invention.

In a surface shape recognition sensor device 10, a switch 4B is arranged between a biometric recognition unit 3 and a detection electrode 12B of a detection element 1B, unlike the above-described first embodiment (FIG. 2). The remaining parts are the same as in the above-described first embodiment. The same reference numerals as in FIG. 2 denote the same or similar parts in FIG. 14.

In the arrangement in which the biometric recognition unit 3 executes biometric recognition by applying a signal to an object 9, as in FIG. 5 described above, a potential different from the common potential may be applied to the detection electrode 12B of the detection element 1B, or the detection electrode 12B may be set in a high-impedance state in the surface shape detection operation. In such a case, the switch 4B may be arranged between the detection electrode 12B and the biometric recognition unit 3 to connect the detection electrode 12B to the biometric recognition unit 3 in the biometric recognition operation and to the common potential in the surface shape detection operation.

With this arrangement, in the surface shape detection operation, the detection electrode 12B of the detection element 1B is also connected to the common potential, like a detection electrode 12A of a detection element 1A. Since clear surface shape data with minimum noise can be obtained, the authentication accuracy of personal authentication processing using the surface shape data in the subsequent stage can be increased.

This embodiment has been described on the basis of the first embodiment. However, the fifth embodiment can be applied to any one of the above-described embodiments, and the same function and effect as described above can be obtained.

SIXTH EMBODIMENT

Figure 15A:
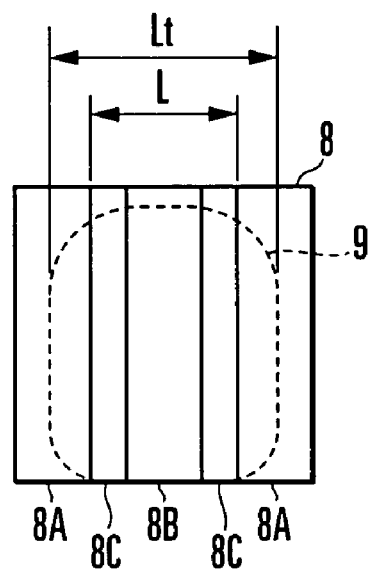
FIGS. 15A and 15B are explanatory views showing the sensor surface structure of a surface shape recognition sensor device according to the sixth embodiment of the present invention.
Figure 15B:
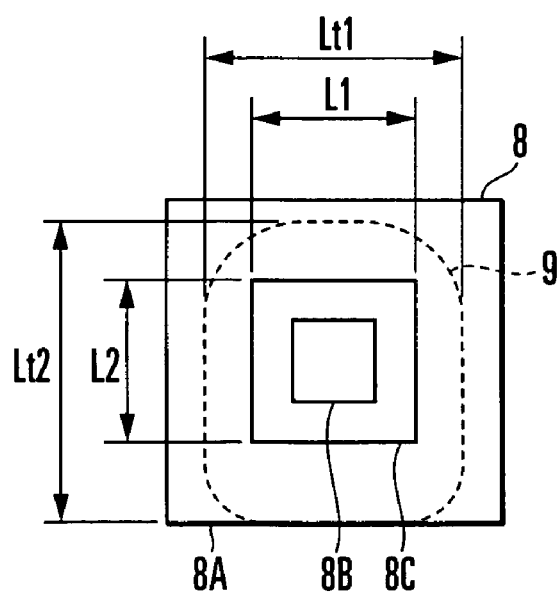

A surface shape recognition sensor device according to the sixth embodiment of the present invention will be described next with reference to FIGS. 15A and 15B. FIGS. 15A and 15B are explanatory views showing the sensor surface structure of the surface shape recognition sensor device according to the sixth embodiment of the present invention.

In the example of the sensor surface structure shown in FIG. 15A, a detection region 8B where a plurality of detection elements 1B used in the above-described second embodiment (FIG. 9) are arranged adjacent is arranged in a band shape which crosses almost the center of a sensor surface 8. Detection regions 8C where a plurality of detection elements 1C are arranged adjacent are arranged in a band shape on both sides of the detection region 8B. Detection regions 8A where a plurality of detection elements 1A are arranged adjacent are arranged outside the detection regions 8C.

The two detection regions 8C are arranged to separate the detection regions 8A and 8B from each other. The two detection regions 8A are arranged outside the detection regions 8C. The detection region 8B is arranged inside the detection regions 8C. With this structure, even when the contact position of an object 9 on the sensor surface 8 may shift in the horizontal direction from the center of the sensor surface 8, the object 9 readily contacts both the detection regions 8A and 8B over one of the detection regions 8C. Hence, a stable biometric recognition operation can be executed.

In addition, a width L between the outer edges of the two detection regions 8C including the detection region 8B is smaller than at least a contact width Lt of the object 9 on the sensor surface 8. With this structure, both the detection region 8B and the detection regions 8A on both sides can simultaneously come into contact with the object 9. Hence, a more stable impedance can be obtained in the biometric recognition operation.

In the example of the sensor surface structure shown in FIG. 15B, the detection region 8B where the plurality of detection elements 1B used in the above-described second embodiment (FIG. 9) are arranged adjacent is arranged in an island shape at almost the center of the sensor surface 8. The detection region 8C where the plurality of detection elements 1C are arranged adjacent is arranged in a frame shape which wholly surrounds the periphery of the detection region 8B. The detection region 8A where the plurality of detection elements 1A are arranged adjacent is arranged to surround the entire periphery of the detection region 8C.

The detection region 8C is arranged in a frame shape (ring shape) to separate the detection regions 8A and 8B from each other. The detection region 8A is arranged outside the detection region 8C. The detection region 8B is arranged inside the detection region 8C. With this structure, even when the contact position of the object 9 on the sensor surface 8 may shift in the vertical and horizontal directions from the center of the sensor surface 8, the object 9 readily contacts both the detection regions 8A and 8B over the detection region 8C. Hence, a stable biometric recognition operation can be executed. In this case, the width of the detection region 8C must be smaller than the contact width of the object 9 on the sensor surface 8.

In addition, a horizontal width L1 and vertical width L2 between the outer edges of the detection region 8C including the detection region 8B are smaller than at least a contact horizontal width Lt1 and contact horizontal width Lt2 of the object 9 on the sensor surface 8, respectively. With this structure, the detection region 8B and the detection region 8A around it can simultaneously come into contact with the object 9 at a plurality of points (four points in the vertical and horizontal directions) or through the entire periphery. Hence, a more stable impedance can be obtained in the biometric recognition operation.

Referring to FIGS. 15A and 15B, a plurality of detection region layout patterns may be arranged on the sensor surface 8. In this case, the object 9 readily contacts both the detection regions 8A and 8B over the detection region 8C. Hence, a stable biometric recognition operation can be executed.

In the example shown in FIGS. 15A and 15B, the outside shape of the sensor surface 8 is square, or the detection regions 8A, 8B, and 8C are rectangular or have a square outside shape. However, the present invention is not limited to this. For example, a rectangular, circular, or elliptical shape may be used.

In this embodiment, the detection region 8C including the detection elements 1C is arranged between the detection region 8A and the detection region 8B on the basis of the above-described second embodiment (FIG. 9). However, this embodiment can also be applied to the arrangement based on the above-described first embodiment (FIG. 2) without the detection elements 1C.

In this case, on the sensor surface 8, the detection regions 8A and 8B are arranged adjacent without the detection region 8C in FIGS. 15A and 15B. The same function and effect as in the above-described arrangement including the detection region 8C can be obtained.

SEVENTH EMBODIMENT

[Arrangement of Biometric Recognition Unit]

Figure 16:
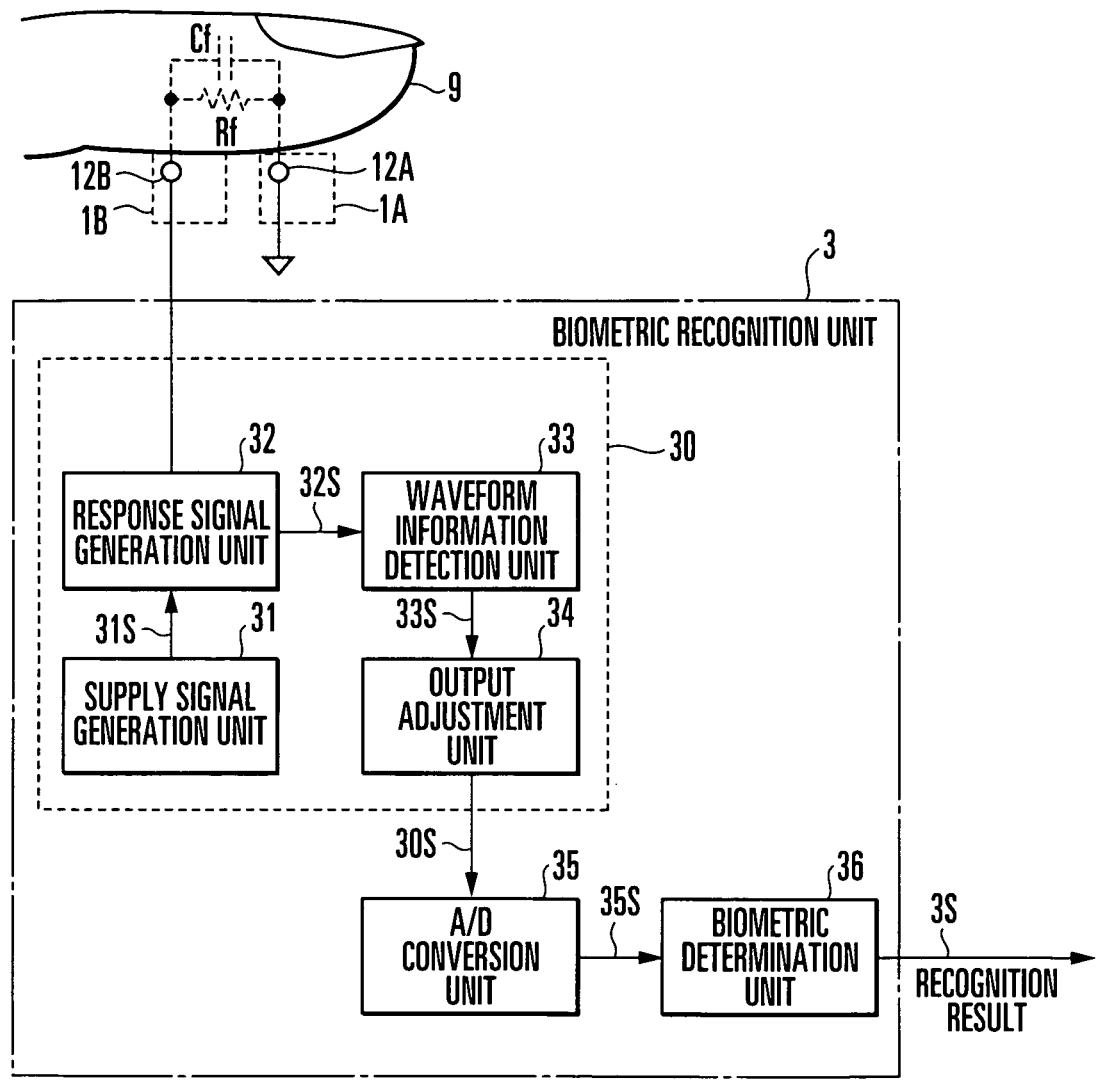
FIG. 16 is a block diagram showing another embodiment of the biometric recognition unit shown in FIG. 2.
Figure 17A:
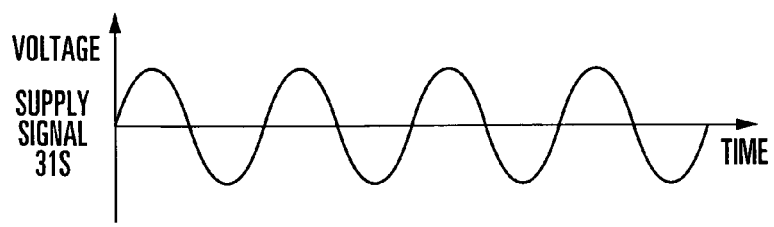
FIGS. 17A to 17D are timing charts showing signal waveforms in phase difference detection by the biometric recognition unit shown in FIG. 16.
Figure 17B:
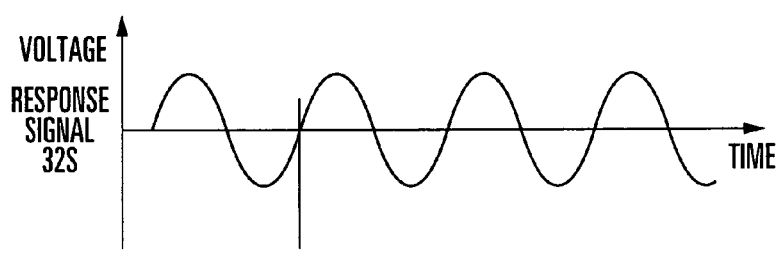
Figure 17C:
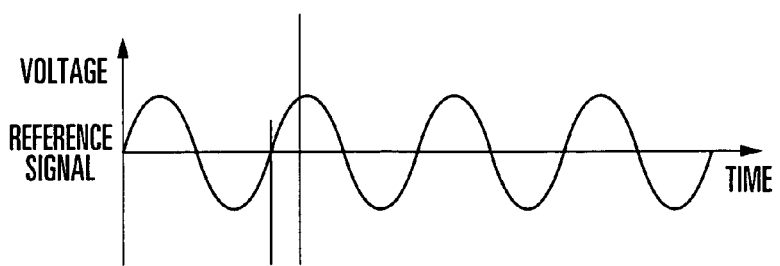
Figure 17D:
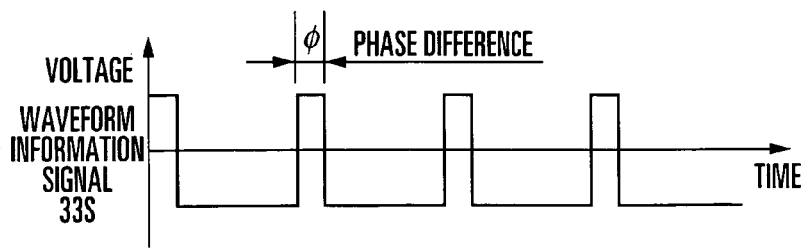

The detailed arrangement of a biometric recognition unit 3 used in a surface shape recognition sensor device according to still another embodiment of the present invention will be described next with reference to FIG. 16. FIG. 16 is a block diagram showing the arrangement of the biometric recognition unit. The same reference numerals as in FIG. 1 or 5 denote the same parts or parts having the same functions in FIG. 16.

The biometric recognition unit 3 includes a supply signal generation unit 31, response signal generation unit 32, waveform information detection unit 33, output adjustment unit 34, A/D conversion unit 35, and biometric determination unit 36. Of these circuit units, the supply signal generation unit 31, response signal generation unit 32, waveform information detection unit 33, and output adjustment unit 34 are arranged as an impedance detection unit 30 together with a detection element 1B as a pair.

Detection elements 1A and 1B come into electrical contact with an object 9 through detection electrodes 12A and 12B to connect a capacitance component Cf and resistance component Rf of the impedance of the object 9 to the response signal generation unit 32. The supply signal generation unit 31 generates a supply signal 31S such as a sine wave of a predetermined frequency and outputs it to the response signal generation unit 32. The response signal generation unit 32 supplies the supply signal 31S from the supply signal generation unit 31 to the detection electrode 12B of the detection element 1B and outputs, to the waveform information detection unit 33, a response signal 32S which changes depending on the output impedance of the detection element 1B, i.e., the capacitance component and resistance component of the impedance of the object 9.

The waveform information detection unit 33 detects the amplitude or the phase difference of the supply signal 31S as waveform information on the basis of the waveform indicated by the response signal 32S from the response signal generation unit 32 and outputs a waveform information signal 33S containing the waveform information to the output adjustment unit 34. The output adjustment unit 34 adjusts and converts the waveform information signal 33S from the waveform information detection unit 33 into a voltage value corresponding to the waveform information and outputs it as a detection signal 30S.

The A/D conversion unit 35 A/D-converts the detection signal 30S from the output adjustment unit 34 and outputs it as determination data 35S formed from digital data. On the basis of the waveform information contained in the determination data 35S from the A/D conversion unit 35, the biometric determination unit 36 determines whether the object 9 is a living body, and outputs a recognition result 3S.

When the object 9 comes into contact with the detection elements 1A and 1B, the supply signal 31S applied from the supply signal generation unit 31 to the detection elements 1A and 1B changes depending on the impedance characteristic, i.e., the capacitance component and resistance component unique to the object 9 and is output from the response signal generation unit 32 as the response signal 32S. The waveform information detection unit 33 detects the amplitude or phase difference of the response signal 32S. The detection signal 30S containing the information representing the detection result is output to the output adjustment unit 34. The detection signal 30S is converted into the determination data 35S by the A/D conversion unit 35 and output to the biometric determination unit 36.

FIGS. 17A to 17D show examples of signal waveforms in phase difference detection. When a sine wave with its center at the common potential such as the ground potential is used as the supply signal 31S, the phase of the response signal 32S changes in accordance with the impedance of the object 9. When a signal synchronized with the supply signal 31S is used as the reference signal, and its phase is compared with the phase of the response signal 32S by the waveform information detection unit 33, the waveform information signal 33S having a pulse width corresponding to, e.g., a phase difference $\phi$ is output.

On the basis of whether the information of the phase difference, i.e., capacitance component (imaginary component) contained in the determination data 35S falls within the reference range of the phase difference of an authentic living body, the biometric determination unit 36 determines whether the object 9 is a living body.

Figure 18A:
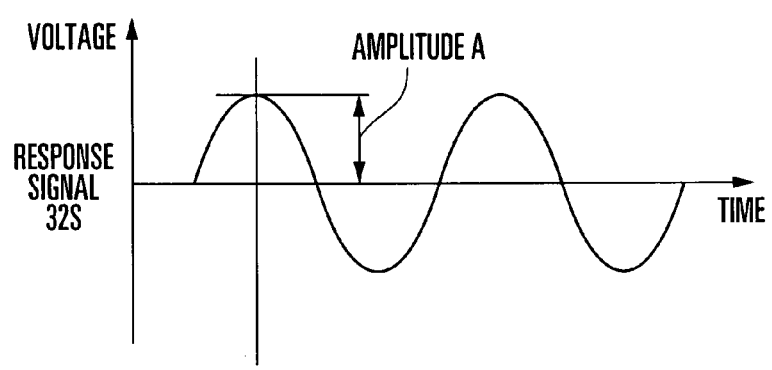
FIGS. 18A and 18B are timing charts showing signal waveforms in amplitude detection by the biometric recognition unit shown in FIG. 16.
Figure 18B:
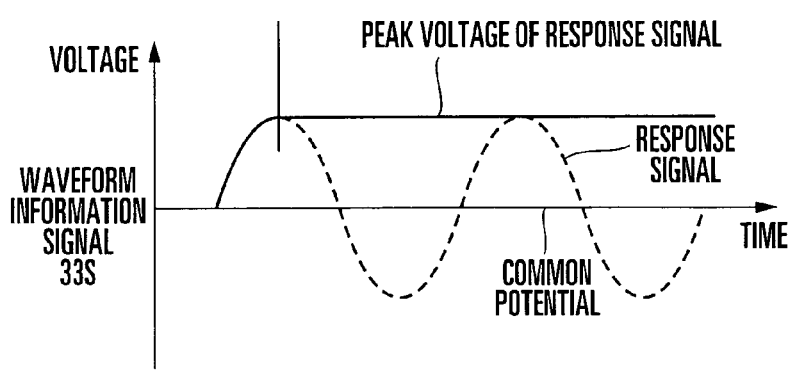

FIGS. 18A and 18B show examples of signal waveforms in amplitude detection. When a sine wave with its center at the common potential such as the ground potential is used as the supply signal 31S, the response signal 32S changes to an amplitude corresponding to the impedance of the object 9 with the center at the common potential. The waveform information detection unit 33 detects the peak voltage of the response signal 32S, i.e., the maximum or minimum value of the voltage, and outputs the waveform information signal 33S representing a DC potential proportional to an amplitude A of the response signal 32S.

On the basis of whether the information of the amplitude, i.e., resistance component (real component) contained in the determination data 35S falls within the reference range of the amplitude of an authentic living body, the biometric determination unit 36 determines whether the object 9 is a living body.

Biometric recognition can be done by detecting only one of the phase difference and amplitude. For example, a resistive element or capacitive element which requires a large area is not always necessary, unlike the prior art. Information representing the impedance unique to the object 9 can be detected in detail by a very simple circuit arrangement such as a general comparator and logic circuit. Hence, size reduction of the surface shape recognition sensor device and on-chip device formation can easily be implemented.

Biometric recognition may be executed by detecting both the phase difference and amplitude. As compared to a case in which biometric recognition/determination is done by using information obtained by detecting the real and imaginary components together, it is very difficult to individually adjust the real and imaginary components by selecting the material or material properties of the object. Hence, a high level of security can be obtained against an illicit recognition behavior by using an artificial finger.

In the above-described example, one impedance detection unit 30 is used. However, the present invention is not limited to this. A plurality of impedance detection units 30 may be arranged. In this case, for example, the A/D conversion unit 35 is arranged for each impedance detection unit 30. A plurality of determination data 35S obtained from the A/D conversion units 35 are averaged, and the biometric determination unit 36 executes biometric determination on the basis of the average value. Alternatively, a control unit 25 may sequentially select each impedance detection unit 30, and the detection signal 30S from each impedance detection unit 30 may sequentially be converted into determination data by the single A/D conversion unit 35. The supply signal generation unit need not always be arranged in the impedance detection unit. In this case, the impedance detection unit can be made compact, and the area for fingerprint detection can be increased.

As described above, when the plurality of impedance detection units 30 are arranged, the detection results obtained by the impedance detection units 30 are averaged. Since the impedance detection accuracy can be increased, the security level for illicit authentication by using an artificial finger can be increased.

EIGHTH EMBODIMENT

Figure 19:
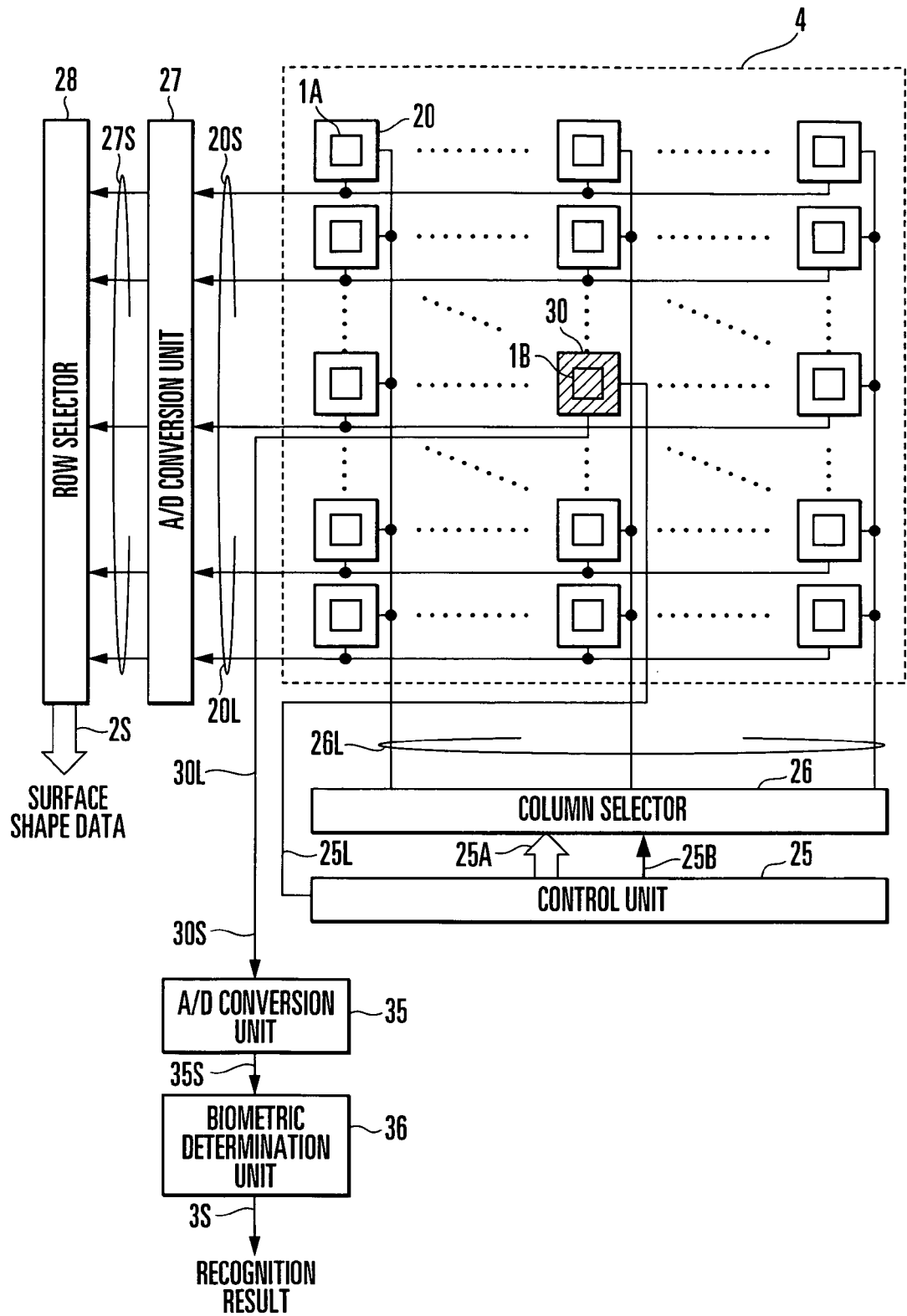
FIG. 19 is a block diagram showing the arrangement of a surface shape recognition sensor device according to the seventh embodiment of the present invention.

A surface shape recognition sensor device according to the eighth embodiment of the present invention will be described next with reference to FIG. 19. FIG. 19 is a block diagram showing the arrangement of the surface shape recognition sensor device according to the eighth embodiment of the present invention. The same reference numerals as in the above-described drawings denote the same or similar parts in FIG. 19.

In a sensor array 4 of a surface shape recognition sensor device 10, a plurality of capacitance detection units 20 for surface shape detection are arranged in a grid shape (matrix) together with detection elements 1A as pairs. In place of one of the capacitance detection units 20, and in this example, the capacitance detection unit 20 arranged at the center of the sensor array 4, an impedance detection unit 30 for biometric recognition is arranged together with a detection element 1B as a pair.

A control unit 25, column selector 26, A/D conversion unit 27, and row selector 28 are circuit units which form a surface shape detection unit 2 described above together with each capacitance detection unit 20. An A/D conversion unit 35 and biometric determination unit 36 are circuit units which form a biometric recognition unit 3 described above together with the impedance detection unit 30.

The surface shape recognition sensor device 10 is formed from one chip as a whole. The capacitance detection units 20 and impedance detection unit 30 are formed at positions corresponding to the detection elements 1A and 1B in the sensor array 4 on the substrate. An interlayer dielectric film is formed on the resultant structure, and the detection elements 1A and 1B are formed on it. The control unit 25, column selector 26, A/D conversion unit 27, and row selector 28, and the A/D conversion unit 35 and biometric determination unit 36 are formed around the formation region of the capacitance detection units 20 and impedance detection unit 30, i.e., in the vacant peripheral region on the substrate.

Of the capacitance detection units 20, the capacitance detection units 20 arrayed in the column direction (vertical direction) are connected to the column selector 26 through a single control line 26L corresponding to the column. In addition, the capacitance detection units 20 arrayed in the row direction (horizontal direction) are connected to the A/D conversion unit 27 through a single data line 20L corresponding to the row. The impedance detection unit 30 is connected to the control unit 25 through an individual control line 25L and also connected to the A/D conversion unit 35 through an individual data line 30L.

The operation of the surface shape recognition sensor device according to this embodiment will be described next.

In executing the surface shape detection operation of detecting the surface shape of an object 9 under the control of a host apparatus (not shown), the control unit 25 outputs an address signal 25A and capacitance detection control signal 25B at predetermined timings.

The column selector 26 sequentially selects one of the control lines 26L on the basis of the address signal 25A and capacitance detection control signal 25B.

Accordingly, the above-described capacitance detection is done by each selected capacitance detection unit 20. A capacitance signal 20S is output to the corresponding data line 20L.

The A/D conversion unit 27 A/D-converts the capacitance signal 20S, which is output from each capacitance detection unit 20 selected by the column selector 26 to the data line 20L, into three-dimensional data 27S and outputs it. The row selector 28 sequentially selects the three-dimensional data 27S obtained from the A/D conversion unit 27 for each data line 20L and outputs surface shape data 2S representing the surface shape of the object 9.

In executing the biometric recognition operation of determining whether the object 9 is a living body under the control of the host apparatus, the control unit 25 selects the individual control line 25L at a predetermined timing. The above-described impedance detection is done by the selected impedance detection unit 30, and a detection signal 30S is output to the corresponding individual data line 30L.

The A/D conversion unit 35 A/D-converts the detection signal 30S output from the impedance detection unit 30 to the individual data line 30L into determination data 35S and outputs it. On the basis of whether the information representing the phase difference or amplitude contained in the determination data 35S falls within the reference range of the phase difference or amplitude of an authentic living body, the biometric determination unit 36 determines whether the object 9 is a living body.

As described above, in this embodiment, the capacitance detection units 20 for surface shape detection are arranged in a matrix on the sensor array 4 together with the detection elements 1A. In place of one of the capacitance detection units 20, the impedance detection unit 30 for biometric recognition is arranged together with the detection element 1B. With this arrangement, the interconnection which connects the detection element 1B for biometric recognition to the impedance detection unit 30 to drive the detection element can be very short. Since the parasitic capacitance or noise of this interconnection can be reduced, the impedance of the object can accurately be detected. Hence, a high determination accuracy can be obtained in biometric recognition.

In the impedance detection unit 30, a predetermined supply signal is applied to the detection element 1B. A signal whose phase and amplitude have changed in accordance with the impedance of the object is acquired as a response signal. Waveform information containing the phase or amplitude representing the waveform of the response signal is detected and output as the detection signal 30S. The detection signal 30S is A/D-converted into the determination data 35S by the A/D conversion unit 35. Then, determination is done by the biometric determination unit 36 on the basis of the determination data 35S. For example, a resistive element or capacitive element which requires a large area is not always necessary, unlike the prior art. Information representing the impedance unique to the object 9 can be detected in detail by a very simple circuit arrangement such as a general comparator and logic circuit. Hence, size reduction of the surface shape recognition sensor device and on-chip device formation can easily be implemented. In addition, the external component such as a resistive element or capacitive element is unnecessary. Since any decrease in security level caused by the external component can be avoided, sufficient security can be obtained.

NINTH EMBODIMENT

Figure 20:
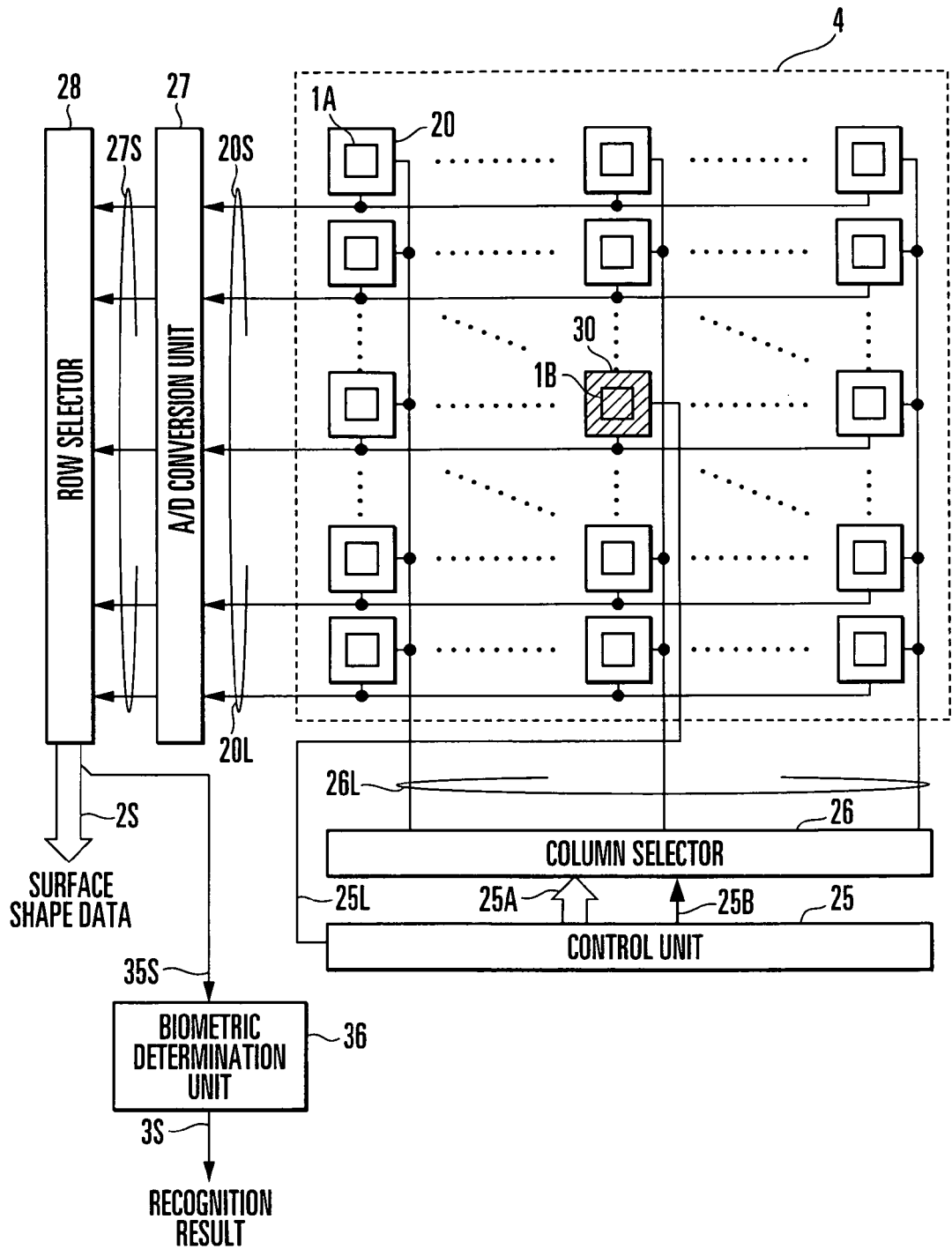
FIG. 20 is a block diagram showing the arrangement of a surface shape recognition sensor device according to the eighth embodiment of the present invention.

A surface shape recognition sensor device according to the ninth embodiment of the present invention will be described next with reference to FIG. 20. FIG. 20 is a block diagram showing the arrangement of the surface shape recognition sensor device according to the ninth embodiment of the present invention. The same reference numerals as in FIG. 19 denote the same or similar parts in FIG. 20.

In this embodiment, an A/D conversion unit 27 also serves as an A/D conversion unit 35, unlike the above-described eighth embodiment (FIG. 19).

In this case, not an individual data line 30L but a data line 20L which connects capacitance detection units 20 arranged in the same column as an impedance detection unit 30 is connected to the impedance detection unit 30. When a control unit 25 selects an individual control line 25L in the biometric recognition operation, the above-described impedance detection is done by the impedance detection unit 30, and a detection signal 30S is output to the corresponding data line 20L.

The A/D conversion unit 27 A/D-converts the detection signal 30S output from the impedance detection unit 30 to the data line 20L into determination data 35S and outputs it. The determination data 35S is output from a row selector 28 to a biometric determination unit 36.

As described above, the A/D conversion unit 27 used in the surface shape detection operation is also used in the biometric recognition operation. Since the A/D conversion unit 35 for the biometric recognition operation can be omitted, the chip area and manufacturing cost can be reduced.

In addition, since the individual data line 30L is unnecessary, the chip area can be reduced. Especially, when a plurality of impedance detection units 30 are arranged, the effect of omitting the individual data line 30L is large because the individual data line 30L is necessary for each impedance detection unit 30.

10TH EMBODIMENT

Figure 21:
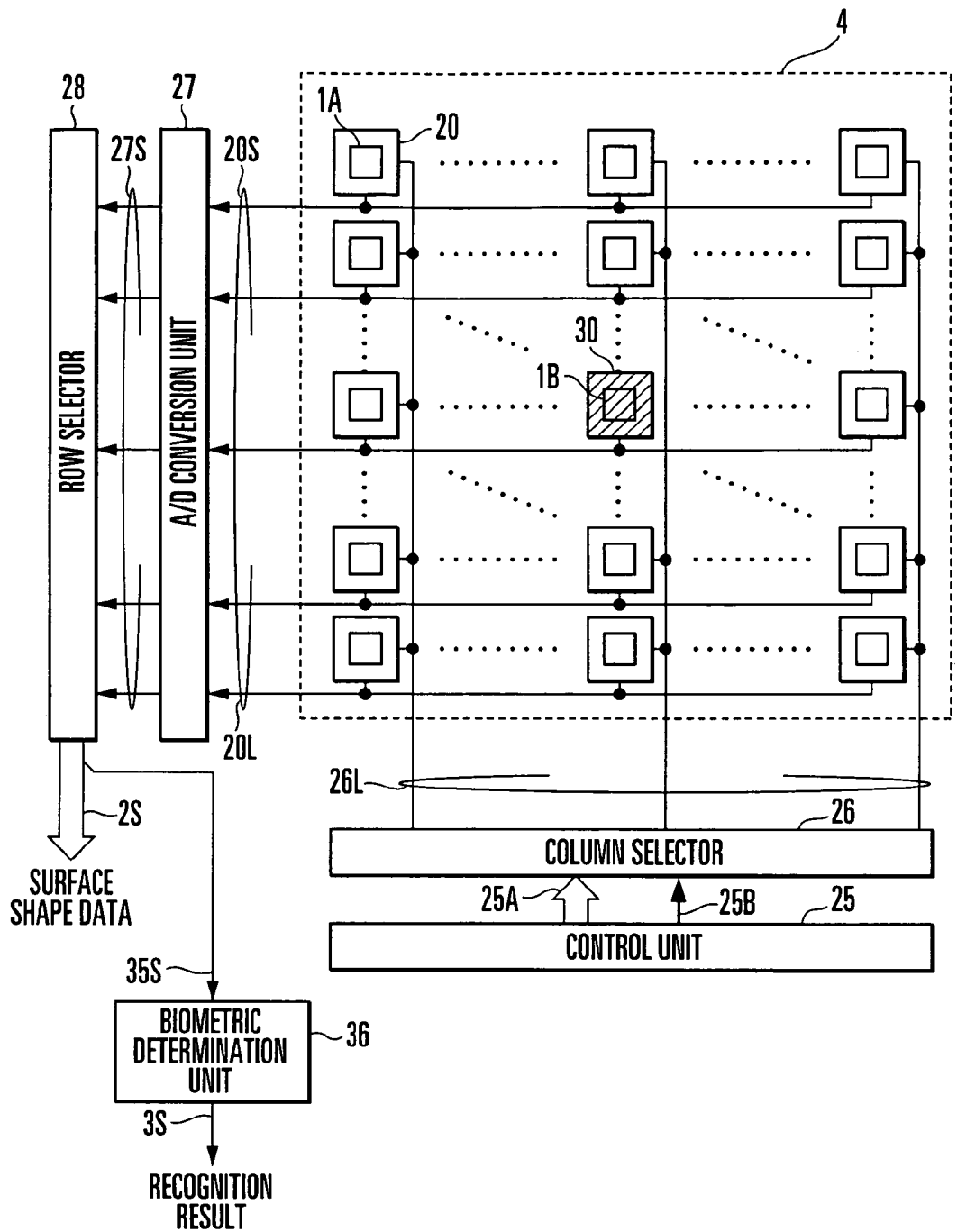
FIG. 21 is a block diagram showing the arrangement of a surface shape recognition sensor device according to the ninth embodiment of the present invention.
Figure 24:
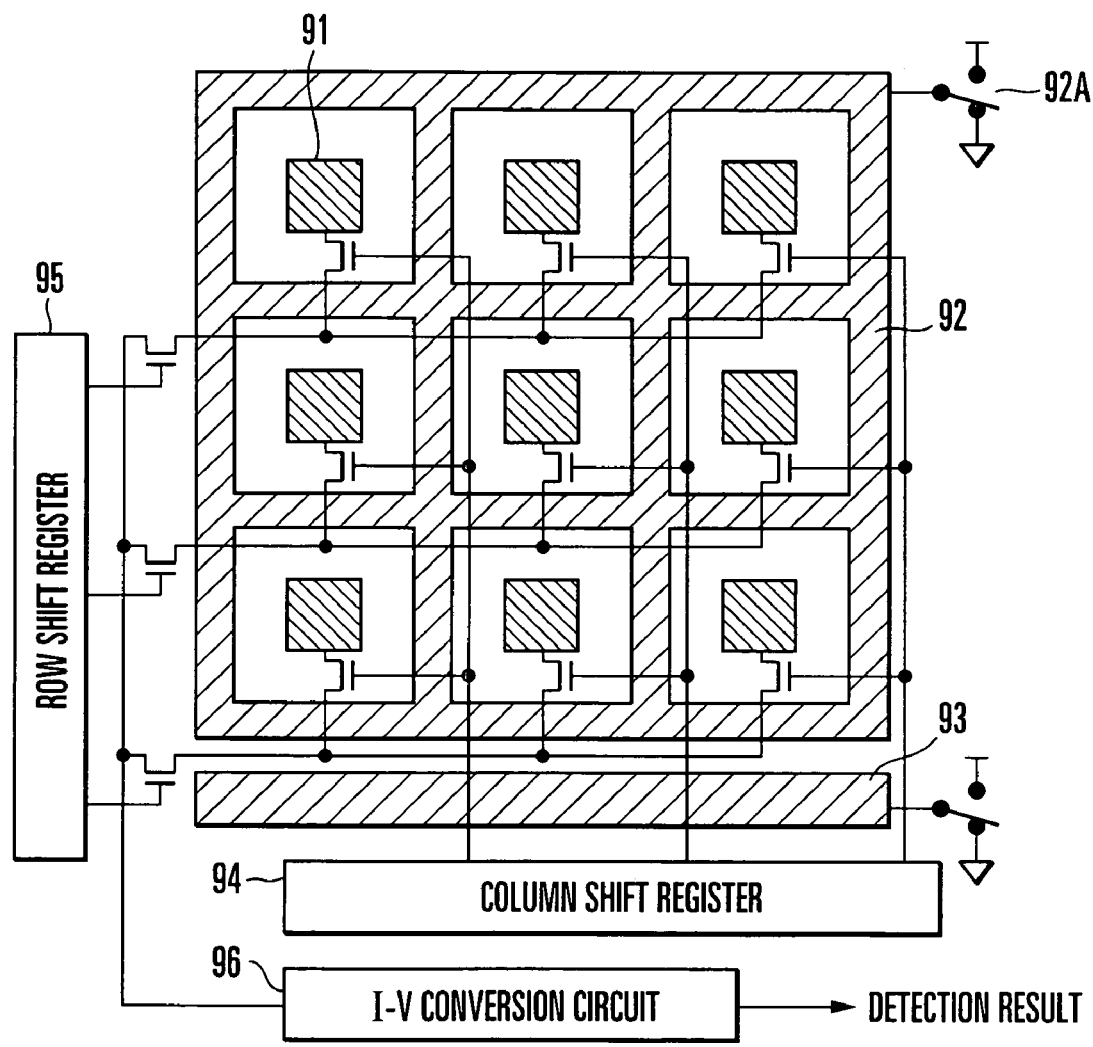
FIG. 24 is a block diagram showing an individual authentication sensor according to the second prior art.

A surface shape recognition sensor device according to the 10th embodiment of the present invention will be described next with reference to FIG. 21. FIG. 21 is a block diagram showing the arrangement of the surface shape recognition sensor device according to the 10th embodiment of the present invention. The same reference numerals as in FIG. 20 denote the same or similar parts in FIG. 21.

In this embodiment, a control line 26L also serves as an individual control line 25L, unlike the above-described ninth embodiment (FIG. 20).

In this case, not the individual control line 25L but the control line 26L which connects capacitance detection units 20 arranged in the same column as an impedance detection unit 30 is connected to the impedance detection unit 30. In the biometric recognition operation, on the basis of an address signal 25A and capacitance detection control signal 25B from a control unit 25, a column selector 26 selects the control line 26L connected to the impedance detection unit 30, and the above-described impedance detection is done.

As described above, the control line 26L is also used as the individual control line 25L. Since the individual control line 25L can be omitted, the chip area can be reduced. Especially, when a plurality of impedance detection units 30 are arranged, the effect of omitting the individual control line 25L is large because the individual control line 25L is necessary for each impedance detection unit 30.

In executing the above-described embodiments, when biometric recognition is done by using a plurality of impedance detection units 30, appropriate embodiments may be selected and combined for each impedance detection unit 30.

For example, depending on the layout positions of individual impedance detection units 30 or the layout number of impedance detection units 30, the vacant region to form the individual control line 25L or individual data line 30L cannot be ensured in some cases. For the impedance detection units 30, the data line 20L of the capacitance detection units 20 may also serve as the individual data line 30L by using the second embodiment. Alternatively, the control line 26L or data line 20L of the capacitance detection units 20 also serves as the individual control line 25L or individual data line 30L by using the third embodiment. Accordingly, the impedance detection units can be laid out at desired positions without being limited by the vacant region.

When the individual control line 25L is used as in the ninth embodiment, the entire column selector 26 need not be operated in the biometric authentication operation. Hence, the power consumption and noise in the entire device can be reduced. When the individual data line 30L and individual control line 25L are used as in the 10th embodiment, the entire column selector 26 and the entire A/D conversion unit 27 need not be operated in the biometric authentication operation. Hence, the power consumption and noise in the entire device can further be reduced.

The invention claimed is:

1. A surface shape recognition sensor device comprising a plurality of two-dimensionally disposed basic detection units which each includes at least a first detection element and a second detection element, said surface shape recognition sensor device comprising:

a first detection electrode, as a component of said first detection element, for forming a capacitance depending on irregularities of a surface shape of an object by coming into contact therewith through the intermediary of an insulating film;

a second detection electrode, as a component of said second detection element, for forming a capacitance depending on irregularities of a surface shape of the object by coming into contact therewith through the intermediary of said insulating film;

a third detection electrode, as another component of said first detection element, which is disposed around said first detection electrode belonging to the same said first detection element and which is brought into electrical contact with the object and connected to a predetermined common potential;

a fourth detection electrode, as another component of said second detection element, which is disposed around said second detection electrode belonging to the same said second detection element and which is brought into electrical contact with the object;

a surface shape detection unit, which is electrically connected, respectively, to said first detection electrode of said first detection element and said second detection electrode of said second detection element that belongs to the same said basic detection unit, for detecting irregularities of the surface shapes of the object corresponding to positions thereof where said first and said second detection elements are respectively placed, based on said capacitances formed in said first detection electrode and said second detection electrode, respectively; and a biometric recognition unit, which is electrically connected, respectively, to said third detection electrode of said first detection element and said fourth detection electrode of said second detection element that belong to the same said basic detection unit, for determining whether the object is a living body based on a signal generated correspondingly to an impedance formed across a portion of the object electrically connected between said third detection electrode and said fourth detection electrode;

wherein said plurality of basic detection units each including said first detection element and said second detection element perform both a surface shape detection function and a biometric recognition function.

2. A surface shape recognition sensor device according to claim 1, further comprising:

a third detection element which is disposed between said first detection element and said second detection element and includes a fifth detection electrode for forming a capacitance depending on irregularities of a surface shape of the object by coming into contact therewith through the intermediary of an insulating film, and a sixth detection electrode maintained at a high-impedance state;

wherein said surface state detection unit is electrically connected to said fifth detection electrode to detect irregularities of the surface shape of the object corresponding to a position thereof where said third detection element is placed, based on said capacitance formed in said fifth detection electrode.

3. A surface shape recognition sensor device according to claim 2, further comprising:

a switch means, electrically connected between a fifth detection electrode of said third detection element and said common potential, for opening the electrical connection between said fifth detection electrode and said common potential when said biometric recognition unit is to perform said biometric recognition function, and closing said electrical connection between said fifth detection electrode and said common potential when said surface shape detection unit is to perform said surface shape detection function.

4. A surface shape recognition sensor device according to claim 1, further comprising:
   a third detection element which is disposed between said first detection element and said second detection element and includes a fifth detection electrode for forming a capacitance depending on irregularities of a surface shape of the object by coming into contact therewith through the intermediary of an insulating film, a sixth detection electrode connected to said common potential, and an insulating film for insulating the object from said second detection electrode;
   wherein said surface state detection unit is electrically connected to said fifth detection electrode to detect irregularities of the surface shape of the object corresponding to a position thereof where said third detection element is placed, based on said capacitance formed in said fifth detection electrode.

* * * * *